(12) United States Patent
Adams

(10) Patent No.: US 12,179,651 B2
(45) Date of Patent: Dec. 31, 2024

(54) APPARATUS FOR DRINK CONTAINER

(71) Applicant: Dwayne Lee Adams, Waubaushene (CA)

(72) Inventor: Dwayne Lee Adams, Waubaushene (CA)

(73) Assignee: Dadamz Inc., Ontario (CA)

(*) Notice: Subject to any disclaimer, the term of this patent is extended or adjusted under 35 U.S.C. 154(b) by 417 days.

(21) Appl. No.: 17/472,368

(22) Filed: Sep. 10, 2021

(65) Prior Publication Data

US 2021/0402907 A1 Dec. 30, 2021

Related U.S. Application Data

(63) Continuation-in-part of application No. 15/477,421, filed on Apr. 3, 2017, now abandoned.

(51) Int. Cl.
*B60N 3/10* (2006.01)

(52) U.S. Cl.
CPC ............ *B60N 3/103* (2013.01); *B60N 3/108* (2013.01)

(58) Field of Classification Search
CPC ........ B60N 3/002; B60N 3/101; B60N 3/103; B60N 3/107; B60N 3/108; Y10S 224/926; Y10S 224/904
USPC ......................................................... 224/544
See application file for complete search history.

(56) References Cited

U.S. PATENT DOCUMENTS

| 1,632,347 A | 4/1925 | Pipkin |
| 3,698,675 A | 10/1972 | Erew et al. |
| 4,340,146 A | 7/1982 | Stratton |
| 5,075,897 A | 12/1991 | Daniels |
| 5,246,151 A * | 9/1993 | Jabara ................ B60R 7/04 248/205.2 |
| 5,975,333 A | 11/1999 | Lee |
| D455,935 S | 4/2002 | Detiveaux |
| 6,749,082 B1 | 6/2004 | Nickel |
| 7,328,876 B2 * | 2/2008 | Jones ................ B60N 3/107 220/694.1 |
| 7,614,523 B1 | 11/2009 | Fixler et al. |
| 7,708,247 B2 | 5/2010 | Lota |
| 9,192,246 B2 * | 11/2015 | Chen ................ A47C 7/622 |
| 9,221,376 B2 | 12/2015 | Baker |
| 10,343,577 B1 * | 7/2019 | Medoro .............. B60N 3/108 |

(Continued)

FOREIGN PATENT DOCUMENTS

JP 2001322473 A * 11/2001
WO 2009057867 5/2009

OTHER PUBLICATIONS

JP-2001322473-A Translation, Suzuki H, Nov. 20, 2001 (Year: 2001).*

*Primary Examiner* — Nathan J Newhouse
*Assistant Examiner* — Matthew T Theis
(74) *Attorney, Agent, or Firm* — Sand, Sebolt & Wernow Co., LPA

(57) ABSTRACT

An apparatus includes a flexible absorbent panel configured to surround, at least in part, a drink container. The drink container is configured to receive a liquid therein. The flexible absorbent panel is also configured to surround, at least in part, the drink container. The flexible absorbent panel is also configured to absorb, at least in part, the liquid once the flexible absorbent panel is positioned, at least in part, proximate to the drink container, and the liquid is inadvertently spilled from the drink container.

19 Claims, 33 Drawing Sheets

(56) References Cited

U.S. PATENT DOCUMENTS

| | | |
|---|---|---|
| 2004/0129747 A1* | 7/2004 | Maierholzner ........... B60R 7/04 224/544 |
| 2005/0082455 A1 | 4/2005 | Jones |
| 2006/0266748 A1 | 11/2006 | Crawford |
| 2007/0205204 A1 | 9/2007 | Novak |
| 2008/0023610 A1 | 1/2008 | Williams |
| 2008/0289074 A1 | 11/2008 | Ward |
| 2014/0224817 A1 | 8/2014 | Morris et al. |
| 2018/0208094 A1 | 7/2018 | Medina Luna et al. |

* cited by examiner

APPARATUS FOR DRINK CONTAINER

CROSS REFERENCE TO RELATED APPLICATIONS

This application is a continuation-in-part of prior co-pending U.S. patent application Ser. No. 15/477,421, filed on Apr. 3, 2017; the disclosure of which is incorporated herein by reference.

TECHNICAL FIELD

This document relates to the technical field of (and is not limited to) (A) an apparatus for a drink container, (B) an apparatus for a drink container and for a cup receiver of a drink-holder assembly, and/or (C) an apparatus for a drink container and for a cup receiver of a drink-holder assembly of a vehicle.

BACKGROUND

A cup holder is a device configured to hold a cup or a drinking vessel in a relatively stationary position (such as, securely on a desk or reference surface, etc.). The cup holder may be built into or retrofitted to, a vehicle, an automobile, a chair, a wall (such as, the wall of an airplane, a boat, a bus or a train).

SUMMARY

It will be appreciated that there exists a need to mitigate (at least in part) at least one problem associated with the existing drink container (also called the existing technology). After much study of the known systems and methods with experimentation, an understanding of the problem and its solution has been identified and is articulated as follows:

The installation of cup holders in automobiles has increased significantly. People consider the design, location and number of cup holders in a vehicle to be an important attribute for influencing their vehicle purchase. Others take a contrary view that cup holders are not only irrelevant but encourage a dangerous practice that distracts drivers from their primary task (of driving, etc.). Cars designed primarily for the North American market have tended to have larger cup holders, while those for which the primary market is outside of North America tend to have smaller ones. However, as most cars are now built for a global market which includes the United States, many cars, such as in Europe, feature cup holders.

On a table or work desk, coffee cups can be knocked over by the person sitting and working at the desk by their arms or hands. This can happen very easily if the person is disturbed e.g. by a telephone call or by a sudden impulsive move. Coffee cups on desks can also be knocked over by pets such as dogs or cats who may jump up onto the desk. Coffee or tea can also spill out of a cup if the table is knocked by a person walking by.

To mitigate, at least in part, at least one problem associated with the existing technology, there is provided (in accordance with a first major aspect) an apparatus. In accordance with the first major embodiment, the apparatus includes (and is not limited to) a flexible absorbent panel. The flexible absorbent panel may be called a flexible liquid-receiving assembly. The flexible absorbent panel may include, for instance, a fabric or a cloth, etc., and any equivalent thereof. The flexible absorbent panel is configured to surround, at least in part, a cup receiver of a drink-holder assembly of a vehicle once the flexible absorbent panel is positioned proximate to the cup receiver. The vehicle may include, for instance, a car or a truck, etc., and any equivalent thereof. The cup receiver of the drink-holder assembly is configured to receive, at least in part, a drink container. The drink container may include, for instance, a paper cup, a metal container, etc., and any equivalent thereof. The drink container is configured to receive a liquid therein. The liquid may include, for instance, coffee, a hot beverage, a cold beverage, etc. The flexible absorbent panel is configured to surround, at least in part, the drink container once the flexible absorbent panel is positioned to surround, at least in part, the cup receiver of the drink-holder assembly, and the drink container is positioned, at least in part, in the cup receiver. The flexible absorbent panel is also configured to absorb, at least in part, the liquid once the flexible absorbent panel is positioned, at least in part, proximate to the drink container, and the liquid is inadvertently spilled from the drink container.

To mitigate, at least in part, at least one problem associated with the existing technology, there is provided (in accordance with a second major aspect) an apparatus. In accordance with the second major embodiment, the apparatus includes (and is not limited to) a synergistic combination of a flexible absorbent panel, a receiver assembly and a support assembly. The flexible absorbent panel provides a void. The void is configured to receive, at least in part, a drink container, and this is done in such a way that the flexible absorbent panel is positioned between a top section and a bottom section of the drink container. The drink container is configured to receive a liquid therein. The receiver assembly defines a mouth, and the mouth is configured to be received, at least in part, in a drink-holder assembly of a vehicle. The support assembly is configured to extend, at least in part, radially from the receiver assembly. The support assembly is also configured to selectively securely support, at least in part, the flexible absorbent panel in such a way that the support assembly, in use, positions, at least in part, the flexible absorbent panel at a position that is located proximate to the mouth of the receiver assembly. The flexible absorbent panel is configured to absorb, at least in part, the liquid once the flexible absorbent panel is positioned, at least in part, proximate to the drink container, and the liquid is inadvertently spilled from the drink container.

To mitigate, at least in part, at least one problem associated with the existing technology, there is provided (in accordance with a third major aspect) an apparatus. In accordance with the third major embodiment, the apparatus includes (and is not limited to) a synergistic combination of a flexible absorbent panel, a receiver assembly and a support assembly. The flexible absorbent panel provides, at least in part, a void. The void is configured to receive, at least in part, a drink container, and this is done in such a way that the flexible absorbent panel is positioned between a top section and a bottom section of the drink container. The drink container is configured to receive a liquid therein. The receiver assembly is configured to be received, at least in part, in a drink-holder assembly of a vehicle. Preferably, the receiver assembly is configured to be supported, at least in part, by the drink-holder assembly. The receiver assembly includes a vertically-extending lateral side wall having an upper wall portion and a lower wall portion. The upper wall portion provides, at least in part, a mouth. The mouth is configured to receive, at least in part, the drink container. The mouth is also configured to be positioned, at least in part, proximate to the vertically-extending lateral side wall of the receiver assembly. The mouth is also configured to correspond, at least in part, with the void of the flexible absorbent panel, and this is done in such a way that the mouth is registered, at least in part, with the void once the void of the flexible absorbent panel is positioned proximate to the mouth of the receiver assembly. The support assembly may be called a flap structure. The support assembly is configured to extend, at least in part, radially from the vertically-extending lateral side wall of the receiver assembly. The support assembly is also configured to contact, at least in part, the vertically-extending lateral side wall of the receiver assembly. The support assembly is also configured to surround, at least in part, the vertically-extending lateral side wall of the receiver assembly. The support assembly is also configured to selectively securely support, at least in part, the flexible absorbent panel in such a way that the support assembly, in use, positions, at least in part, the flexible absorbent panel at a position that is located proximate to the mouth of the receiver assembly. The flexible absorbent panel is also configured to absorb, at least in part, a liquid once the flexible absorbent panel is positioned, at least in part, proximate to the drink container, and the liquid is inadvertently spilled from the drink container.

To mitigate, at least in part, at least one problem associated with the existing technology, there is provided (in accordance with a fourth major aspect) an apparatus. In accordance with the fourth major embodiment, the apparatus includes and is not limited to (comprises) a flexible absorbent panel. The flexible absorbent panel is configured to surround, at least in part, a drink container, and in which the drink container is configured to receive a liquid therein. The flexible absorbent panel is also configured to surround, at least in part, the drink container. The flexible absorbent panel is also configured to absorb, at least in part, the liquid once the flexible absorbent panel is positioned, at least in part, proximate to the drink container, and the liquid is inadvertently spilled from the drink container.

To mitigate, at least in part, at least one problem associated with the existing technology, there is provided (in accordance with a fifth major aspect) an apparatus. In accordance with the fifth major embodiment, the apparatus includes and is not limited to (comprises) a receiver assembly defining a mouth. A support assembly is configured to extend, at least in part, radially from the receiver assembly. The support assembly is also configured to selectively securely support, at least in part, a flexible absorbent panel in such a way that the support assembly, in use, positions, at least in part, the flexible absorbent panel at a position that is located proximate to the mouth of the receiver assembly. The flexible absorbent panel provides, at least in part, a void. The void is configured to receive, at least in part, a drink container in such a way that the flexible absorbent panel is positioned between a top section and a bottom section of the drink container, and in which the drink container is configured to receive a liquid therein. The flexible absorbent panel is configured to absorb, at least in part, the liquid once the flexible absorbent panel is positioned, at least in part, proximate to the drink container, and the liquid is inadvertently spilled from the drink container.

To mitigate, at least in part, at least one problem associated with the existing technology, there is provided (in accordance with a sixth major aspect) an apparatus. In accordance with the sixth major embodiment, the apparatus includes and is not limited to (comprises) a flexible absorbent panel providing, at least in part, a void, and in which the void is configured to receive, at least in part, a drink container in such a way that the flexible absorbent panel is positioned between a top section and a bottom section of the drink container. The drink container is configured to receive a liquid therein. A receiver assembly includes a vertically-extending lateral side wall having an upper wall portion and a lower wall portion, and the upper wall portion providing, at least in part, a mouth. The mouth is configured to receive, at least in part, the drink container. The mouth is also configured to be positioned, at least in part, proximate to the vertically-extending lateral side wall of the receiver assembly. The mouth is also configured to correspond, at least in part, with the void of the flexible absorbent panel in such a way that the mouth is registered, at least in part, with the void once the void of the flexible absorbent panel is positioned proximate to the mouth of the receiver assembly. A support assembly is configured to extend, at least in part, radially from the vertically-extending lateral side wall of the receiver assembly. The support assembly is also configured to contact, at least in part, the vertically-extending lateral side wall of the receiver assembly. The support assembly is also configured to surround, at least in part, the vertically-extending lateral side wall of the receiver assembly. The support assembly is also configured to selectively securely support, at least in part, the flexible absorbent panel in such a way that the support assembly, in use, positions, at least in part, the flexible absorbent panel at a position that is located proximate to the mouth of the receiver assembly. The flexible absorbent panel is also configured to absorb, at least in part, the liquid once the flexible absorbent panel is positioned, at least in part, proximate to the drink container, and the liquid is inadvertently spilled from the drink container.

In another aspect, an exemplary embodiment of the present disclosure may provide an apparatus. The apparatus includes a panel and a receiver assembly operably engaged with the panel, wherein the receiver assembly is configured to retain the panel inside of the receiver assembly; wherein the liner is removably attached with the receiver assembly. This exemplary embodiment or another exemplary embodiment may further provide that the receiver assembly is configured to interlockingly engage the liner with the receiver assembly. This exemplary embodiment or another exemplary embodiment may further provide that the receiver assembly is configured to retain the liner inside of the receiver assembly via a snap-fit mechanism. This exemplary embodiment or another exemplary embodiment may further provide that the receiver assembly further comprises: a base member; at least one circumferential wall extending from a top wall of the base member to an opposing bottom wall of the base member and defining a recess; and at least one side opening defined in the at least one circumferential wall positioned between the top wall of the base member and the bottom wall of the base member. This exemplary embodiment or another exemplary embodiment may further provide that the panel further comprises: at least one circumferential liner extending from a top wall of the panel to an opposing bottom wall of the panel and defining a cavity; and at least one side aperture defined in the at least one circumferential liner positioned between the top wall of the panel and the bottom wall of the panel. This exemplary embodiment or another exemplary embodiment may further provide that the at least one side aperture of the panel and the at least one side opening of the base member are aligned with one another when assembled. This exemplary embodiment or another exemplary embodiment may further provide that the bottom wall of the panel covers the lower wall of the base member inside of the recess defined by the at least one circumferential wall of said base member. This exemplary embodiment or another exemplary embodiment may further provide that the receiver assembly further comprises: at least one retaining assembly operably engaged with the base member at the at least one side opening of said base member and with the panel at the at least one side aperture of said panel. This exemplary embodiment or another exemplary embodiment may further provide that the at least one retaining assembly further comprises: an outer frame; and an inner frame operably engaged with the outer frame; wherein the outer frame and the inner frame cooperatively maintain the base member and the panel together. This exemplary embodiment or another exemplary embodiment may further provide that the outer frame interlockingly engages with the inner frame to cooperatively maintain the base member and the liner together. This exemplary embodiment or another exemplary embodiment may further provide that the outer frame snap-fits with the inner frame to cooperatively maintain the base member and the liner together. This exemplary embodiment or another exemplary embodiment may further provide that the outer frame further comprises: a front wall operably engaged with an outer surface of the base member; and a rear wall operably engaged with base member inside of the at least one side opening of the base member. This exemplary embodiment or another exemplary embodiment may further provide that the inner frame further comprises: a front wall operably engaged with the rear wall of the outer frame inside of the at least side aperture of the panel and inside of the at least one opening of the base member; and a rear wall operably engaged with an inner surface of the panel and the rear wall of the outer frame. This exemplary embodiment or another exemplary embodiment may further provide that the receiver assembly further comprises: a base member; a first circumferential wall extending from a top wall of the base member to an opposing bottom wall of the base member and defining a first recess; a second circumferential wall extending from the top wall of the base member to the bottom wall of the base member and defining a second recess; a first side opening defined in the first circumferential wall positioned between the top wall of the base member and the bottom wall of the base member; and a second side opening defined in the first circumferential wall positioned between the top wall of the base member and the bottom wall of the base member. This exemplary embodiment or another exemplary embodiment may further provide that the panel further comprises: a first circumferential liner extending from a top wall of the panel to an opposing bottom wall of the panel and defining a first cavity; a second circumferential liner extending from the top wall of the panel to the bottom wall of the panel and defining a second cavity; a first side aperture defined in the first circumferential liner positioned between the top wall of the panel and the bottom wall of the panel; and a second side aperture defined in the second circumferential liner positioned between the top wall of the panel and the bottom wall of the panel. This exemplary embodiment or another exemplary embodiment may further provide that the first side opening of the base member is aligned with the first side aperture of the panel; and wherein second side opening of the base member is aligned with the second side aperture of the panel. This exemplary embodiment or another exemplary embodiment may further provide that the receiver assembly further comprises: a first retaining mechanism operably engaged with the base member at the first side opening of said base member and with the panel at the first side aperture of said panel; and a second retaining mechanism operably engaged with the base member at the second side opening of said base member and with the panel at the second side aperture of said panel. This exemplary embodiment or another exemplary embodiment may further provide that the panel is formed from a flexible absorbent material. This exemplary embodiment or another exemplary embodiment may further provide that the base member of the receiver assembly is formed of a rigid plastic material.

In another aspect, an exemplary embodiment of the present disclosure may provide an apparatus. The apparatus includes a panel; a receiver assembly operably engaged with the panel and having at least one retaining mechanism, the at least one retaining mechanism having an outer frame and an inner frame interlockingly engaged with one another to cooperatively maintain a base member and the panel together; wherein the panel is removably attached with the receiver assembly.

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in simplified form that are further described below in the Detailed Description. This Summary is not intended to identify key features or essential features of the disclosed subject matter, and is not intended to describe each disclosed embodiment or every implementation of the disclosed subject matter. Many other novel advantages, features, and relationships will become apparent as this description proceeds. The figures and the description that follow more particularly exemplify illustrative embodiments.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims. The non-limiting embodiments may be more fully appreciated by reference to the following detailed description of the non-limiting embodiments when taken in conjunction with the accompanying drawings, in which:

Figure 1:
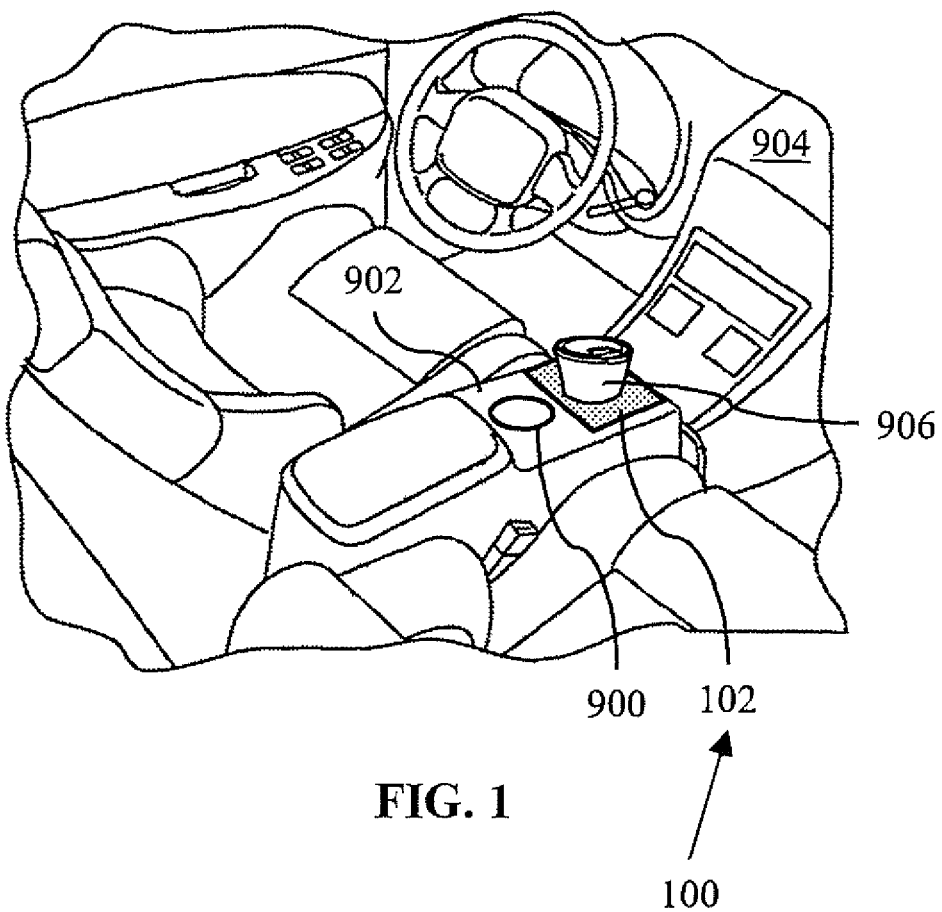
FIG. 1 depicts a perspective view of an embodiment of an apparatus preferably for (and not limited to) use with a drink container and also with a drink-holder assembly of a vehicle.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

Similar numbers refer to similar parts throughout the drawings.

DETAILED DESCRIPTION

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the claim defines the invention (in which the claims may be amended during patent examination after filing of this application). For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described. It will be appreciated that the scope of the meaning of to device configured to be coupled to an item (that is, to be connected to, to interact with the item, etc.) is to be interpreted as the device being configured to be coupled to the item, either directly or indirectly. Therefore, "configured to" may include the meaning "either directly or indirectly" unless specifically stated otherwise.

FIG. 1 depicts a perspective view of an embodiment of an apparatus 100 preferably for (and not limited to) use with a drink-holder assembly 902 and also with a drink-holder assembly 902 of a vehicle 904 (as depicted in FIG. 1).

Referring to the embodiment as depicted in FIG. 1, and in accordance with a first major embodiment, the apparatus 100 includes (and is not limited to) a flexible absorbent panel 102. The flexible absorbent panel 102 may be called a flexible liquid-receiving assembly, etc., and any equivalent thereof The flexible absorbent panel 102 may include, for instance, a fabric or a cloth, etc., and any equivalent thereof. The flexible absorbent panel 102 is configured to surround, at least in part, a drink container 906. The drink container 906 is configured to receive a liquid 908 therein. The flexible absorbent panel 102 is also configured to absorb, at least in part, the liquid 908 once (A) the flexible absorbent panel 102 is positioned, at least in part, proximate to the drink container 906, and (B) the liquid 908 is inadvertently spilled from the drink container 906. The drink container 906 may include, for instance, a paper cup, a metal container, etc., and any equivalent thereof The liquid 908 may include, for instance, coffee, a hot beverage, a cold beverage, etc.

In accordance with an embodiment, the first major embodiment is adapted such that the flexible absorbent panel 102 is configured to surround, at least in part, a cup receiver 900 (also called a cup hole, etc.) of a drink-holder assembly 902 once the flexible absorbent panel 102 is positioned proximate to the cup receiver 900. The drink-holder assembly 902 is provided by (positioned in or installed in) the vehicle 904 (as depicted in FIG. 1). The flexible absorbent panel 102 is configured to be positioned proximate to the cup receiver 900. The cup receiver 900 of the drink-holder assembly 902 is configured to receive, at least in part, a drink container 906. The flexible absorbent panel 102 is also configured to surround, at least in part, the drink container 906 once (A) the flexible absorbent panel 102 is positioned to surround, at least in part, the cup receiver 900 of the drink-holder assembly 902, and (B) the drink container 906 is positioned, at least in part, in the cup receiver 900. The vehicle 904 (as depicted in FIG. 1) may include, for instance, a car or a truck, etc., and any equivalent thereof. For instance, as a result of the drink container 906 being moved relative to the cup receiver 900, the flexible absorbent panel 102 is also configured to absorb, at least in part, the liquid 908 once (A) the flexible absorbent panel 102 is positioned, at least in part, proximate to the drink container 906, and (B) the liquid 908 is inadvertently spilled from the drink container 906.

Figure 2:
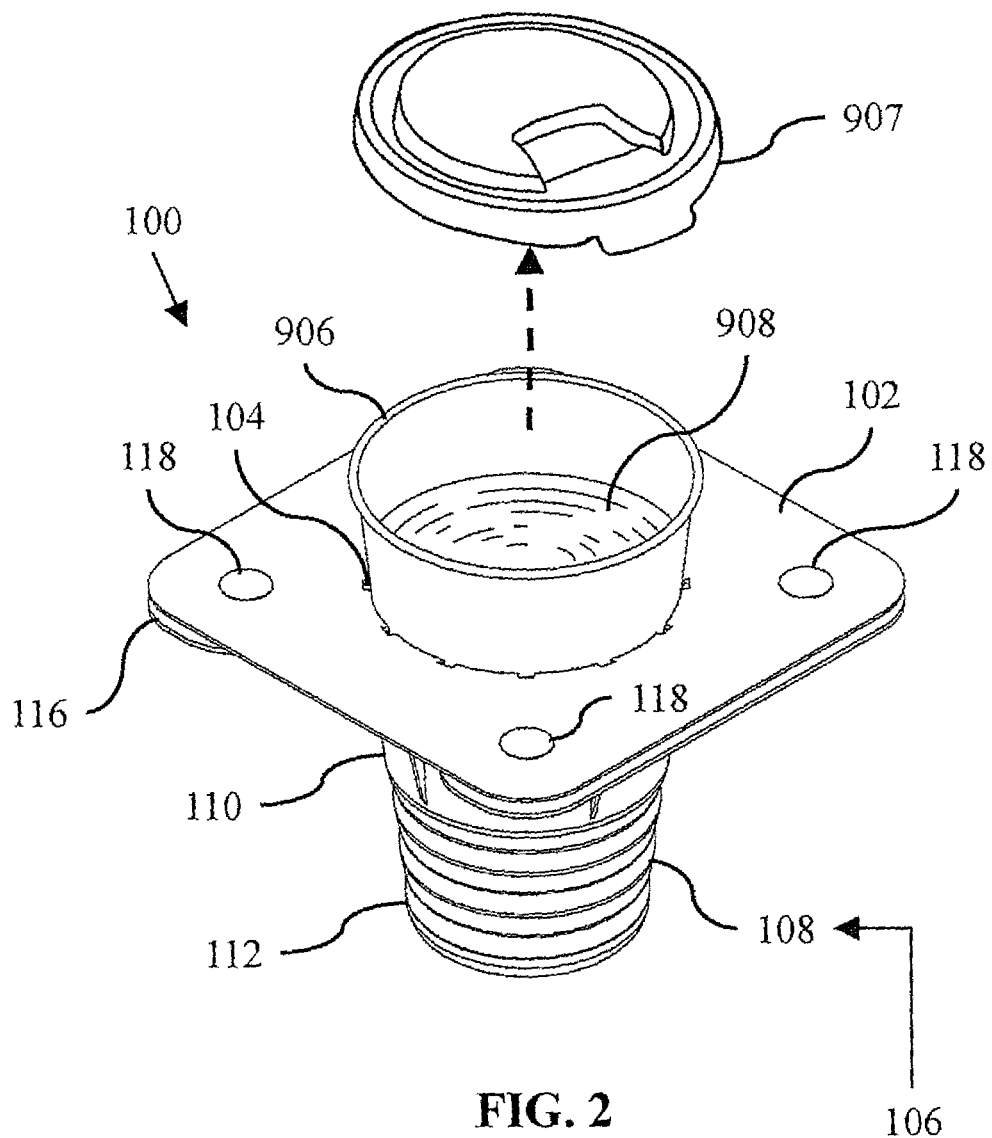
FIG. 2 depicts a top perspective view of an embodiment of the apparatus and the drink container of FIG. 1.

FIG. 2 depicts a top perspective view of an embodiment of the apparatus 100 and the drink-holder assembly 902 of FIG. 1.

Referring to the embodiment as depicted in FIG. 2, the drink container 906 is received in the vertically-extending lateral side wall 108, with the container lid 907 removed from a top section 910 of the drink container 906.

Figure 3:
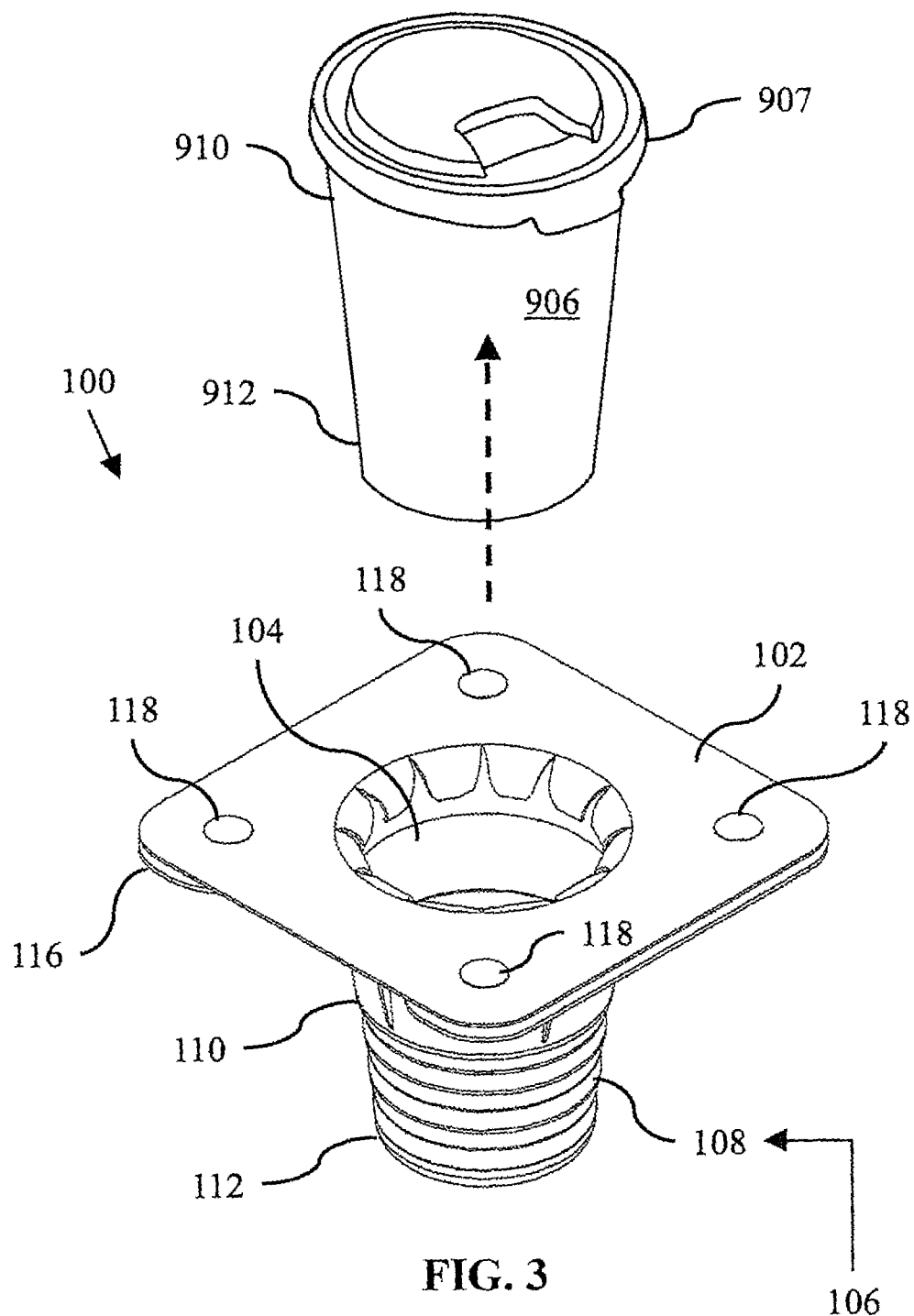
FIG. 3 depicts a top perspective view of an embodiment of the apparatus and the drink container of FIG. 1.

FIG. 3 depicts a top perspective view of an embodiment of the apparatus 100 and the drink-holder assembly 902 of FIG. 1.

Referring to the embodiment as depicted in FIG. 3, the drink container 906 is removed from the vertically-extending lateral side wall 108, with the container lid 907 installed to the top section 910 of the drink container 906.

Figure 4:
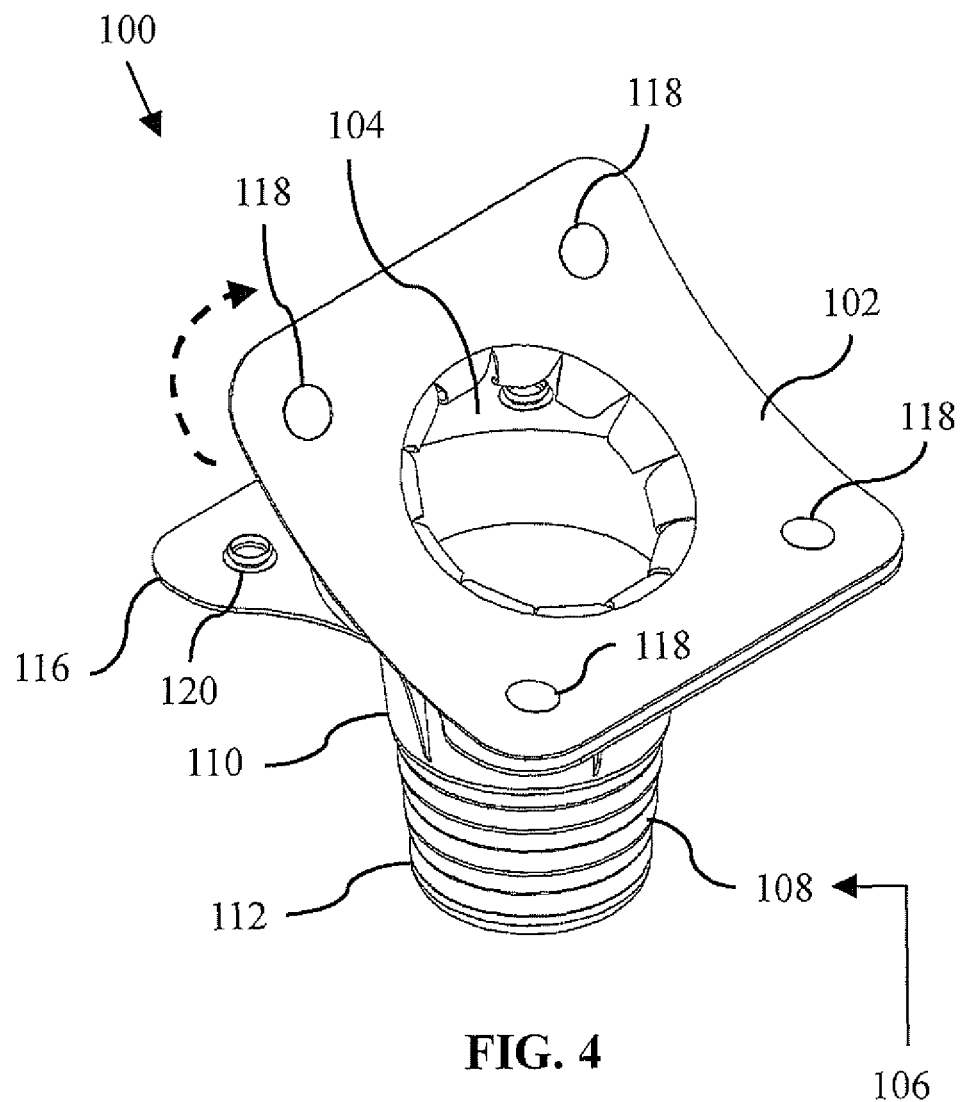
FIG. 4 depicts a top perspective view of an embodiment of the apparatus of FIG. 1.

FIG. 4 depicts a top perspective view of an embodiment of the apparatus 100 of FIG. 1.

Referring to the embodiment as depicted in FIG. 4, the flexible absorbent panel 102 is partially removed from (partially separated from) the support assembly 116.

Figure 5:
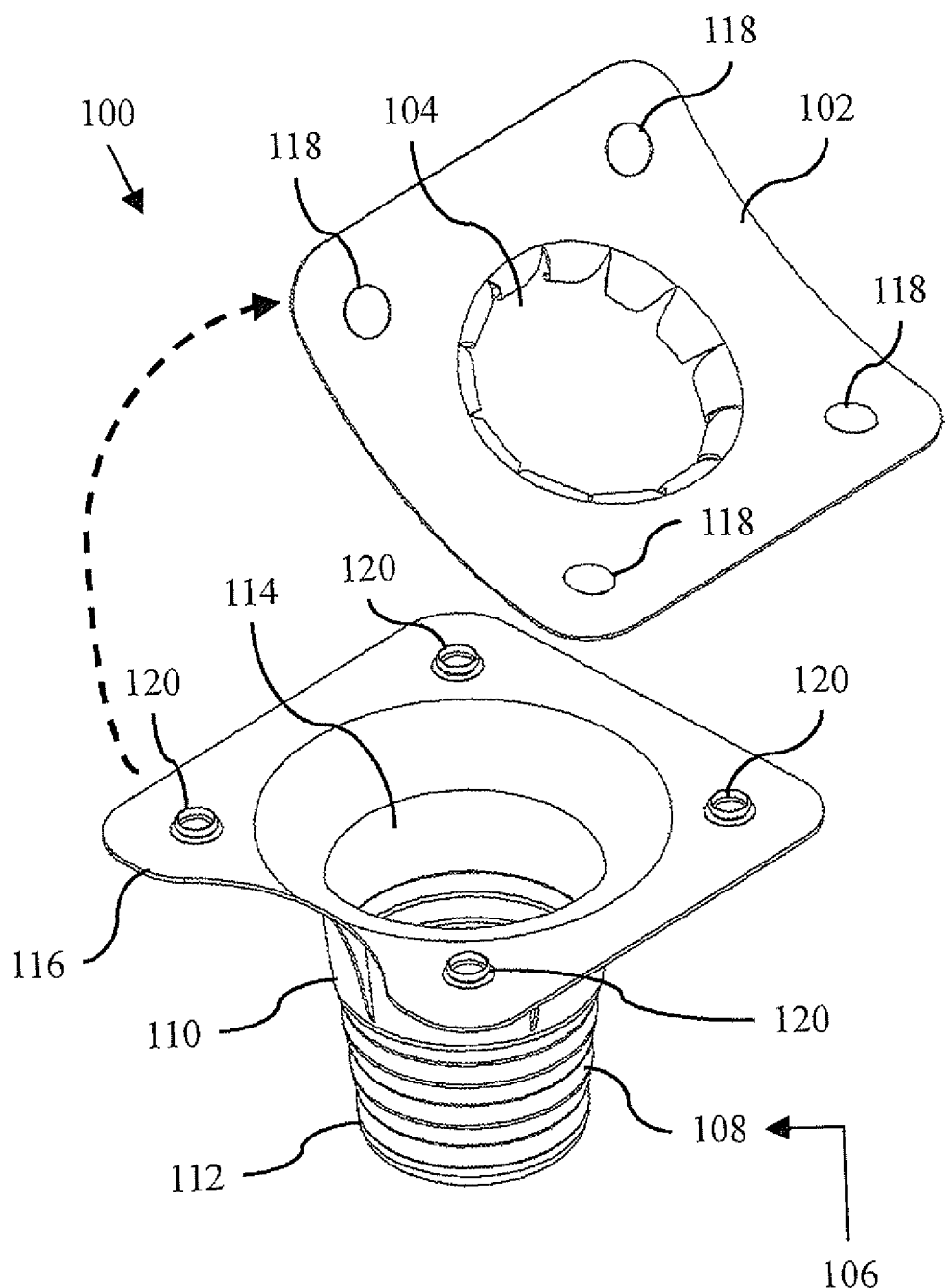
FIG. 5 depicts a top perspective view of an embodiment of the apparatus of FIG. 1.

FIG. 5 depicts a top perspective view of an embodiment of the apparatus 100 of FIG. 1.

Referring to the embodiment as depicted in FIG. 5, the flexible absorbent panel 102 is removed from (separated from or detached from) the support assembly 116.

Figure 6:
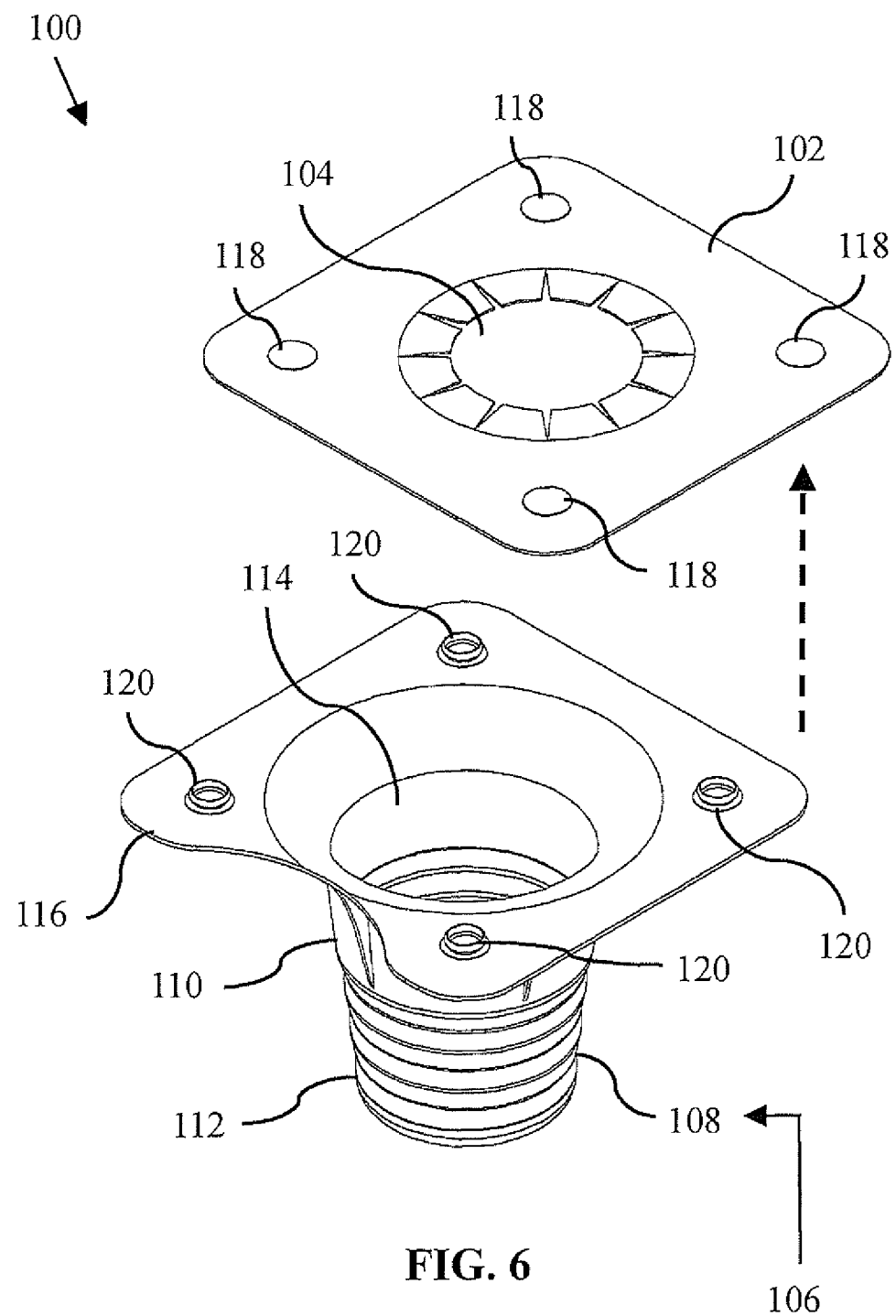
FIG. 6 depicts a top perspective view of an embodiment of the apparatus of FIG. 1.

FIG. 6 depicts a top perspective view of an embodiment of the apparatus 100 of FIG. 1.

Referring to the embodiment as depicted in FIG. 6, the flexible absorbent panel 102 is positioned above the support assembly 116.

Referring to the embodiments as depicted in FIG. 2 to FIG. 6, the flexible absorbent panel 102 defines, at least in part, a void 104. The void 104 is configured to receive, at least in part, the drink container 906. The void 104 is configured to be positioned, at least in part, over and registered, at least in part, with the cup receiver 900 of the drink-holder assembly 902. The void 104 is configured to permit, at least in part, the cup receiver 900 of the drink-holder assembly 902 to receive, at least in part, the drink container 906.

Preferably, the container lid 907 is configured to be selectively attachable to, and selectively detachable from, the top section 910 of the drink container 906.

Referring to the embodiments as depicted in FIG. 2 to FIG. 6, and in accordance with a second major embodiment, the apparatus 100 includes (and is not limited to) a synergistic combination of a receiver assembly 106 and a support assembly 116 (the flexible absorbent panel 102 is an optional item).

The receiver assembly 106 defines (provides) a mouth 114. The support assembly 116 is configured to extend, at least in part, radially from the receiver assembly 106. The support assembly 116 is also configured to selectively securely support, at least in part, the flexible absorbent panel 102. This is done in such a way that the support assembly 116, in use, positions, at least in part, the flexible absorbent panel 102 at a position that is located proximate to the mouth 114 of the receiver assembly 106. The flexible absorbent panel 102, in use, provides, at least in part, a void 104. The void 104 is configured to receive, at least in part, a drink container 906. This is done in such a way that the flexible absorbent panel 102 is positioned between a top section 910 and a bottom section 912 of the drink container 906, and in which the drink container 906 is configured to receive a liquid 908 therein. The flexible absorbent panel 102 is also configured to absorb, at least in part, the liquid 908 once (A) the flexible absorbent panel 102 is positioned, at least in part, proximate to the drink container 906, and (B) the liquid 908 is inadvertently spilled from the drink container 906.

In accordance with an embodiment, the second major embodiment is adapted such that the receiver assembly 106 is configured to be received, at least in part, in a drink-holder assembly 902 of a vehicle 904 (as depicted in FIG. 1). The receiver assembly 106 defines the mouth 114 configured to be received, at least in part, in the drink-holder assembly 902. The flexible absorbent panel 102 is configured to surround, at least in part, the cup receiver 900 of the drink-holder assembly 902 of the vehicle 904.

In accordance with an embodiment, the second major embodiment is adapted such that the support assembly 116 is configured to extend, at least in part, radially from the receiver assembly 106. The support assembly 116 is also configured to selectively securely support, at least in part, the flexible absorbent panel 102 (this is done in such a way that the support assembly 116, in use, positions, at least in part, the flexible absorbent panel 102 at a position that is located proximate to the mouth 114 of the receiver assembly 106). The support assembly 116 is also configured to selectively securely support, at least in part, the flexible absorbent panel 102 proximate to the mouth 114 of the receiver assembly 106.

The second major embodiment is adapted such that (A) the receiver assembly 106 defines the mouth 114 configured to be received, at least in part, in the drink-holder assembly 902 of a vehicle 904 (as depicted in FIG. 1), and (B) the flexible absorbent panel 102 is configured to surround, at least in part, the cup receiver 900 of the drink-holder assembly 902 of the vehicle 904.

In accordance with a preferred option, the void 104 is centrally positioned on the flexible absorbent panel 102.

Referring to the embodiments as depicted in FIG. 2 to FIG. 6, and in accordance with a third major embodiment, the apparatus 100 includes (and is not limited to) a synergistic combination of a flexible absorbent panel 102, a receiver assembly 106 and a support assembly 116.

The flexible absorbent panel 102 provides (defines), at least in part, a void 104. The void 104 is configured to receive, at least in part, a drink container 906, and this is done in such a way that the flexible absorbent panel 102 is positioned between a top section 910 and a bottom section 912 of the drink container 906. The drink container 906 is configured to receive a liquid 908 therein (such as, coffee, a hot beverage, etc.).

The receiver assembly 106 includes a vertically-extending lateral side wall 108 having an upper wall portion 110 and a lower wall portion 112. The upper wall portion 110 provides (defines), at least in part, a mouth 114. The mouth 114 is configured to receive, at least in part, the drink container 906. The mouth 114 is also configured to be positioned, at least in part, proximate to the vertically-extending lateral side wall 108 of the receiver assembly 106. The mouth 114 is also configured to correspond, at least in part, with the void 104 of the flexible absorbent panel 102, and this is done in such a way that the mouth 114 is registered, at least in part, with the void 104 once the void 104 of the flexible absorbent panel 102 is positioned proximate to the mouth 114 of the receiver assembly 106.

The support assembly 116 may be called a flap structure. The support assembly 116 is configured to extend, at least in part, radially from the vertically-extending lateral side wall 108 of the receiver assembly 106. The support assembly 116 is also configured to contact, at least in part, the vertically-extending lateral side wall 108 of the receiver assembly 106. The support assembly 116 is also configured to surround, at least in part, the vertically-extending lateral side wall 108 of the receiver assembly 106. The support assembly 116 is also configured to selectively securely support, at least in part, the flexible absorbent panel 102 proximate to the mouth 114 of the receiver assembly 106. The flexible absorbent panel 102 is also configured to absorb, at least in part, a liquid 908 once the flexible absorbent panel 102 is positioned, at least in part, proximate to the drink container 906, and the liquid 908 is (becomes) inadvertently spilled from the drink container 906 (for instance, as a result of the drink container 906 being moved relative to the cup receiver 900).

In accordance with an embodiment, the third major embodiment is adapted such that the receiver assembly 106 is configured to be received, at least in part, in a drink-holder assembly 902 of a vehicle 904 (as depicted in FIG. 1). Preferably, the receiver assembly 106 is configured to be supported, at least in part, by the drink-holder assembly 902. The receiver assembly 106 is configured to be received, at least in part, in a drink-holder assembly 902 of a vehicle 904. The flexible absorbent panel 102 is configured to surround, at least in part, the cup receiver 900 of the drink-holder assembly 902 of the vehicle 904.

Referring to the embodiments as depicted in FIG. 2 to FIG. 6, the support assembly 116 is configured to selectively securely support the flexible absorbent panel 102 proximate to the mouth 114 of the receiver assembly 106. This is done in such a way that the mouth 114 of the receiver assembly 106 is coaxially aligned with the void 104 of the flexible absorbent panel 102 (once the support assembly 116 receives, at least in part, the flexible absorbent panel 102 proximate to the mouth 114 of the receiver assembly 106).

Referring to the embodiments as depicted in FIG. 2 to FIG. 6, the support assembly 116 is configured to selectively securely support the flexible absorbent panel 102 proximate to the mouth 114 of the receiver assembly 106. This is done in such a way that the flexible absorbent panel 102, in use, receives, at least in part, and retains, at least in part, the liquid 908 that is (becomes) inadvertently spilled from the drink container 906.

Referring to the embodiments as depicted in FIG. 2 to FIG. 6, the mouth 114 is configured to be positioned proximate to the vertically-extending lateral side wall 108 of the receiver assembly 106 at a position that is located proximate to the upper wall portion 110 of the vertically-extending lateral side wall 108.

In accordance with a preferred embodiment, the void 104 is centrally positioned on the flexible absorbent panel 102.

In accordance with a preferred embodiment, the lower wall portion 112 is provided, at least in part, at the lower section of the vertically-extending lateral side wall 108. The lower wall portion 112 extends radially inwards from the vertically-extending lateral side wall 108. In accordance with a preferred embodiment, the mouth 114 is configured to be spaced apart from the lower wall portion 112. In accordance with a preferred embodiment, the mouth 114 is configured to contact, at least in part, the vertically-extending lateral side wall 108 of the receiver assembly 106 at a position that is located above the lower wall portion 112.

In accordance with a preferred embodiment, the lower wall portion 112 is configured to capture, at least in part, the liquid 908 that is (becomes) inadvertently spilled from the drink container 906. It will be appreciated that, as an option, the lower wall portion 112 may not exist or be provided (if so desired).

In accordance with a preferred embodiment, the support assembly 116 is also configured to selectively attach to and detach from the flexible absorbent panel 102. Preferably, the flexible absorbent panel 102 includes a panel connector 118 (such as a female snap-click connector, touch connector, the VELCRO (TRADEMARK) connector, and any equivalent thereof). The support assembly 116 includes a support connector 120 (such as a male snap-click connector, a touch connector, the VELCRO (TRADEMARK) connector, and any equivalent thereof). The panel connector 118 and the support connector 120 are configured to be selectively connectable with, and selectively dis-connectable from, each other. Preferably, each corner section of the flexible absorbent panel 102 includes the panel connector 118, and each corner section of the support assembly 116 includes the support connector 120.

Figure 7:
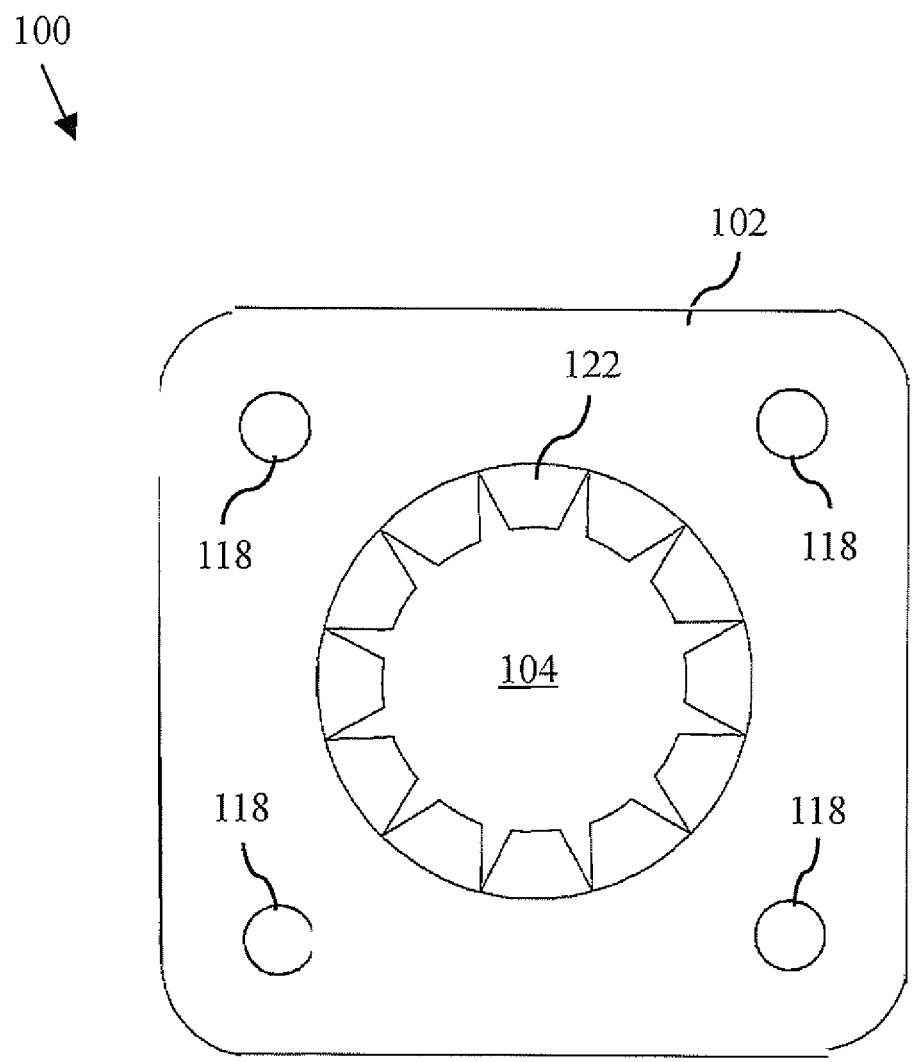
FIG. 7 depicts a top view of an embodiment of the apparatus of FIG. 1.

FIG. 7 depicts a top view of an embodiment of the apparatus 100 of FIG. 1.

Referring to the embodiment as depicted in FIG. 7, the flexible absorbent panel 102 includes a wiper assembly 122 configured to receive condensation from the side wall of the drink container 906. Preferably, the wiper assembly 122 is configured to wipe off condensation (from cups having a colder drink), such as once the drink container 906 is moved relative to the wiper assembly 122 (as depicted in FIG. 2).

Figure 8:
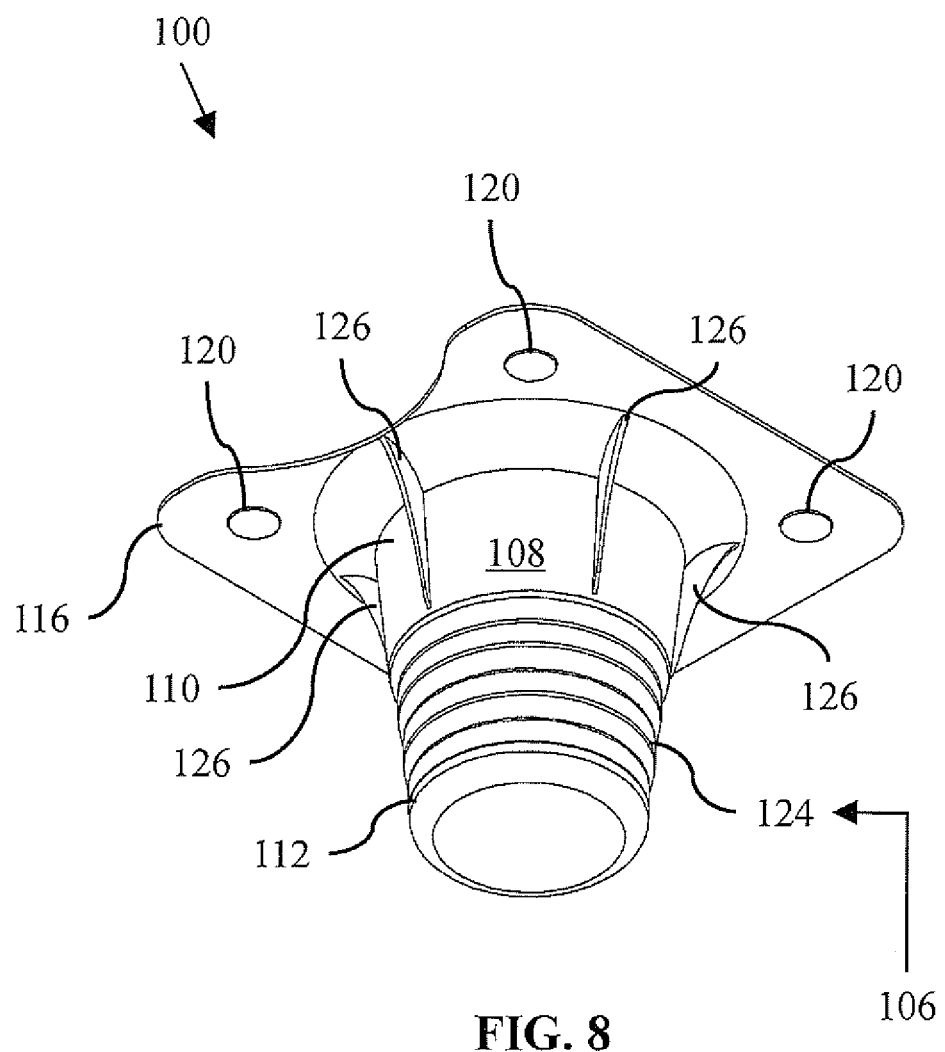
FIG. 8 depicts a bottom perspective view of an embodiment of the apparatus of FIG. 1.

FIG. 8 depicts a bottom perspective view of an embodiment of the apparatus 100 of FIG. 1.

Figure 9:
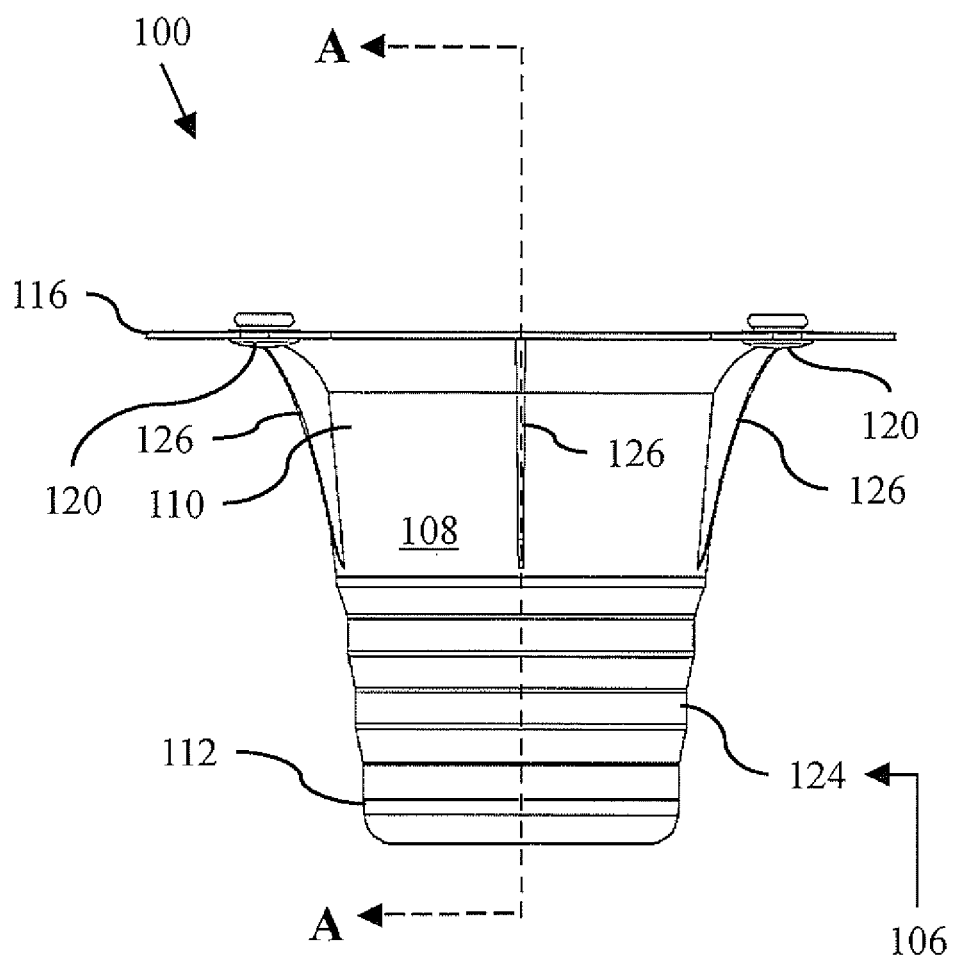
FIG. 9 depicts a side view of an embodiment of the apparatus of FIG. 1.

FIG. 9 depicts a side view of an embodiment of the apparatus 100 of FIG. 1.

Figure 10:
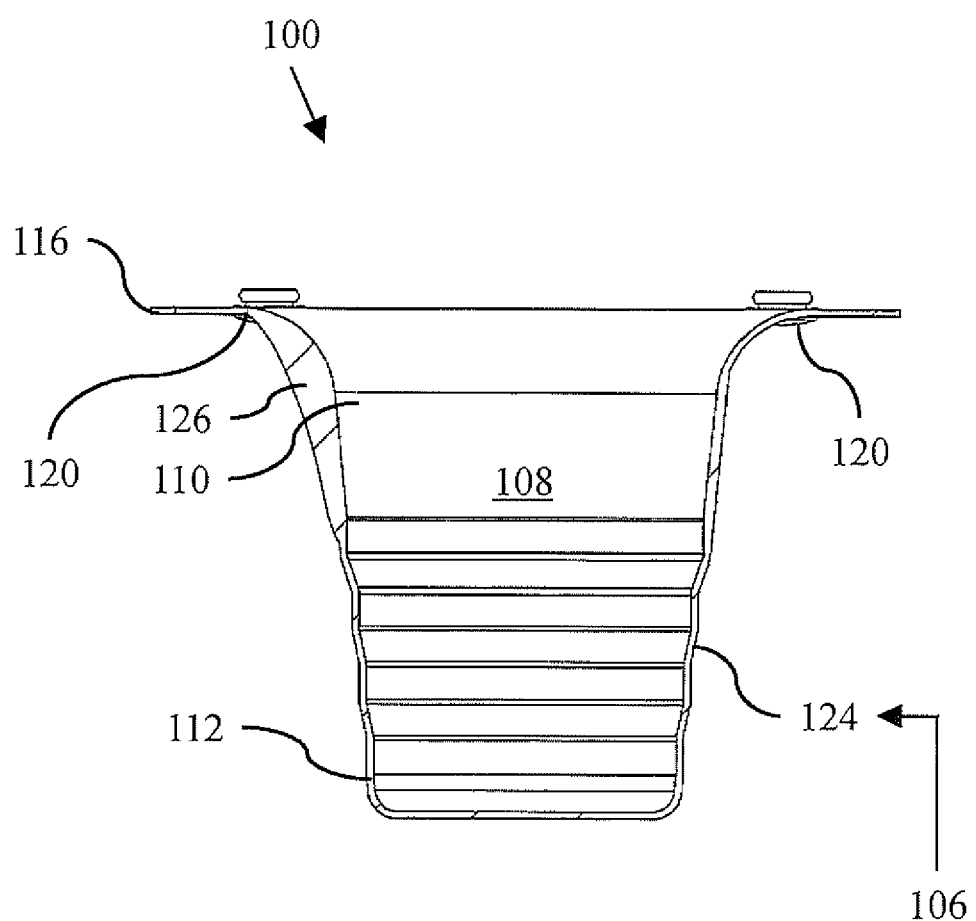
FIG. 10 depicts a cross-sectional view of an embodiment of the apparatus of FIG. 1.

FIG. 10 depicts a cross-sectional view of an embodiment of the apparatus 100 of FIG. 1. The cross-sectional view is taken along a cross-sectional line A-A, as depicted in FIG. 9.

Referring to the embodiments as depicted in FIGS. 8, 9 and 10, the receiver assembly 106 includes an accordion section 124 configured to selectively expand, and to selectively contract, a vertical height of the receiver assembly 106. This is done in such a way that the receiver assembly 106, in use, is receivable (fits), at least in part, into a fixed vertical depth (the various vertical fixed depths) of the drink-holder assembly 902 (as depicted in FIGS. 1, 13, 14 and 15). Advantageously, the accordion section 124 permits the receiver assembly 106 to be usable for a relatively wider range of types of the drink-holder assembly 902.

Figure 13:
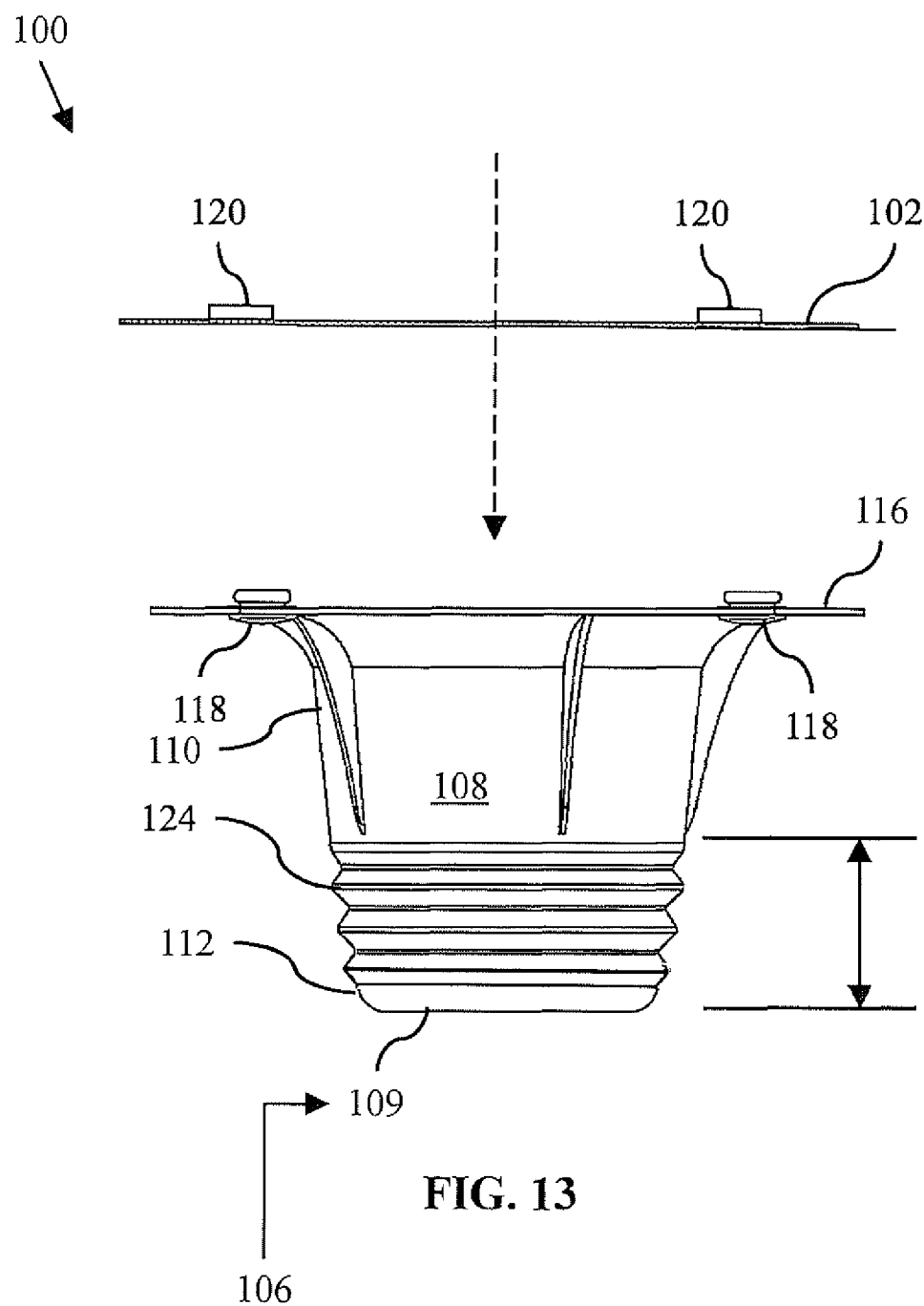
FIG. 13 depicts a side view of an embodiment of the apparatus of FIG. 1.
Figure 14:
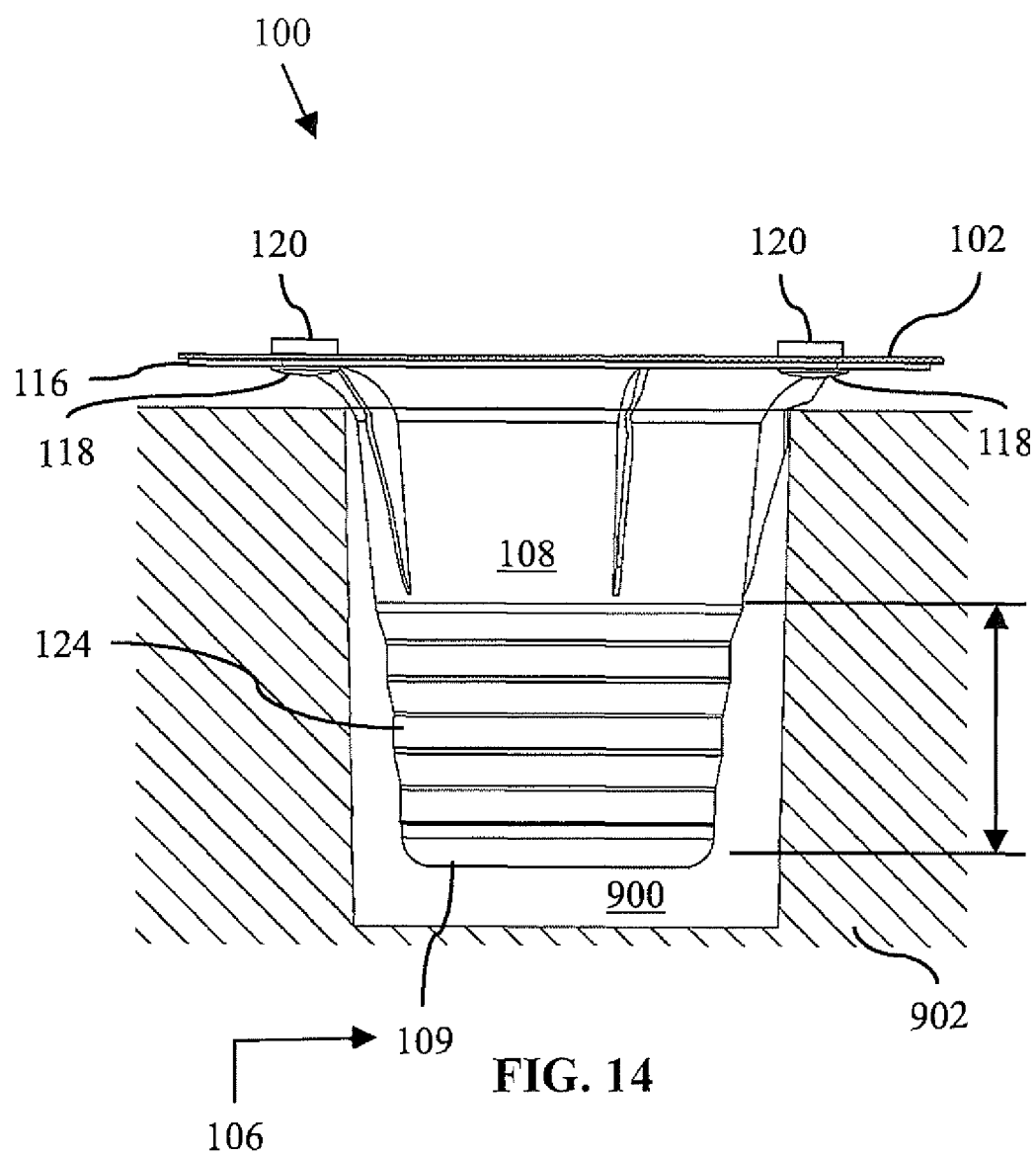
FIG. 14 depicts a side view of an embodiment of the apparatus.
Figure 15:
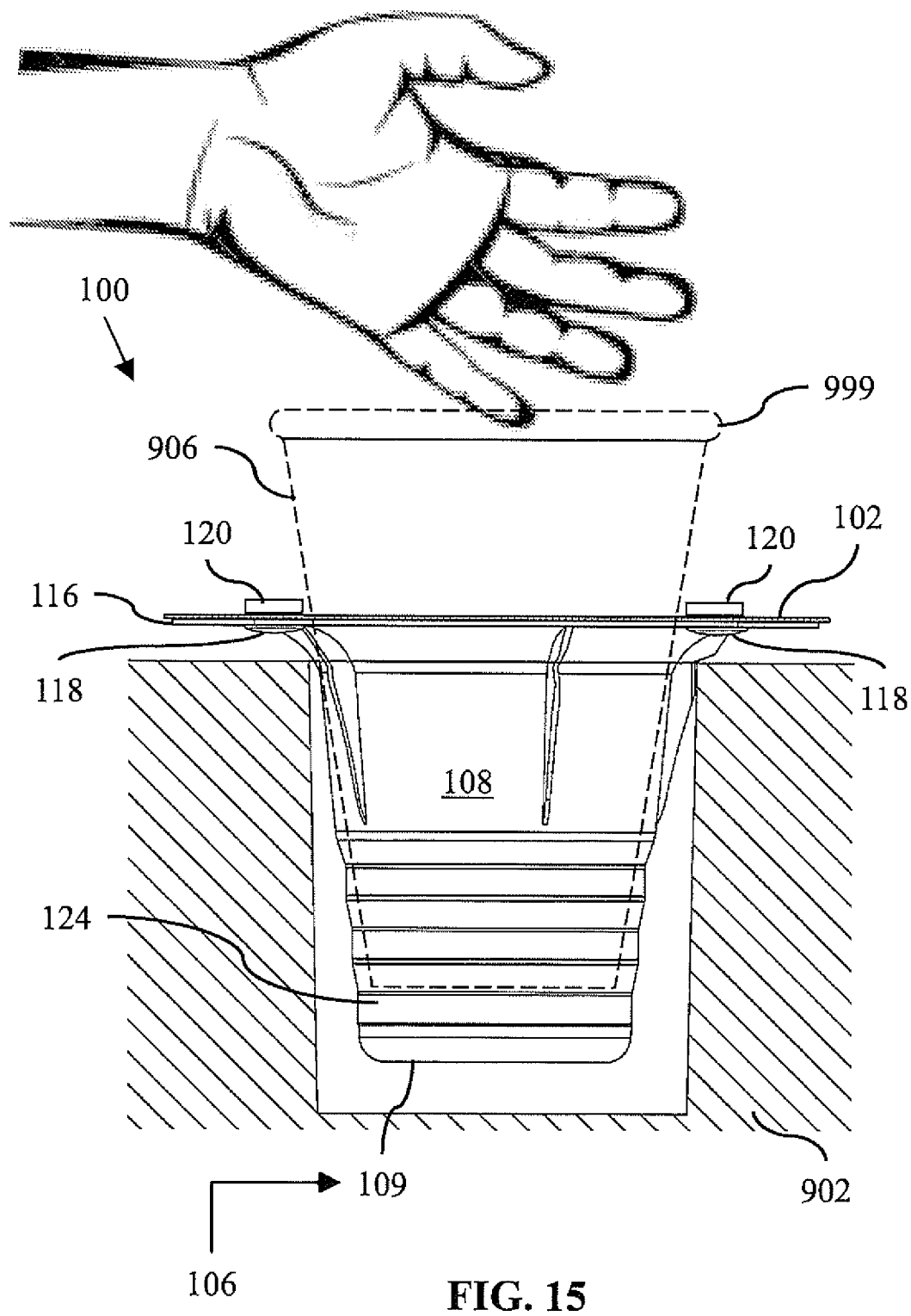
FIG. 15 depicts a side view of an embodiment of the apparatus.

Referring to the embodiments as depicted in FIGS. 8, 9 and 10, the support assembly 116 includes spaced-apart tapered sections 126 positioned beneath the support assembly 116. The spaced-apart tapered sections 126 connect portions of the upper wall portion 110 to the support assembly 116. The spaced-apart tapered sections 126 are configured to accommodate or interface with various sized openings of the drink-holder assembly 902 (as associated with different automobiles having different cup holder sizes), as depicted in FIGS. 13, 14 and 15.

Figure 11:
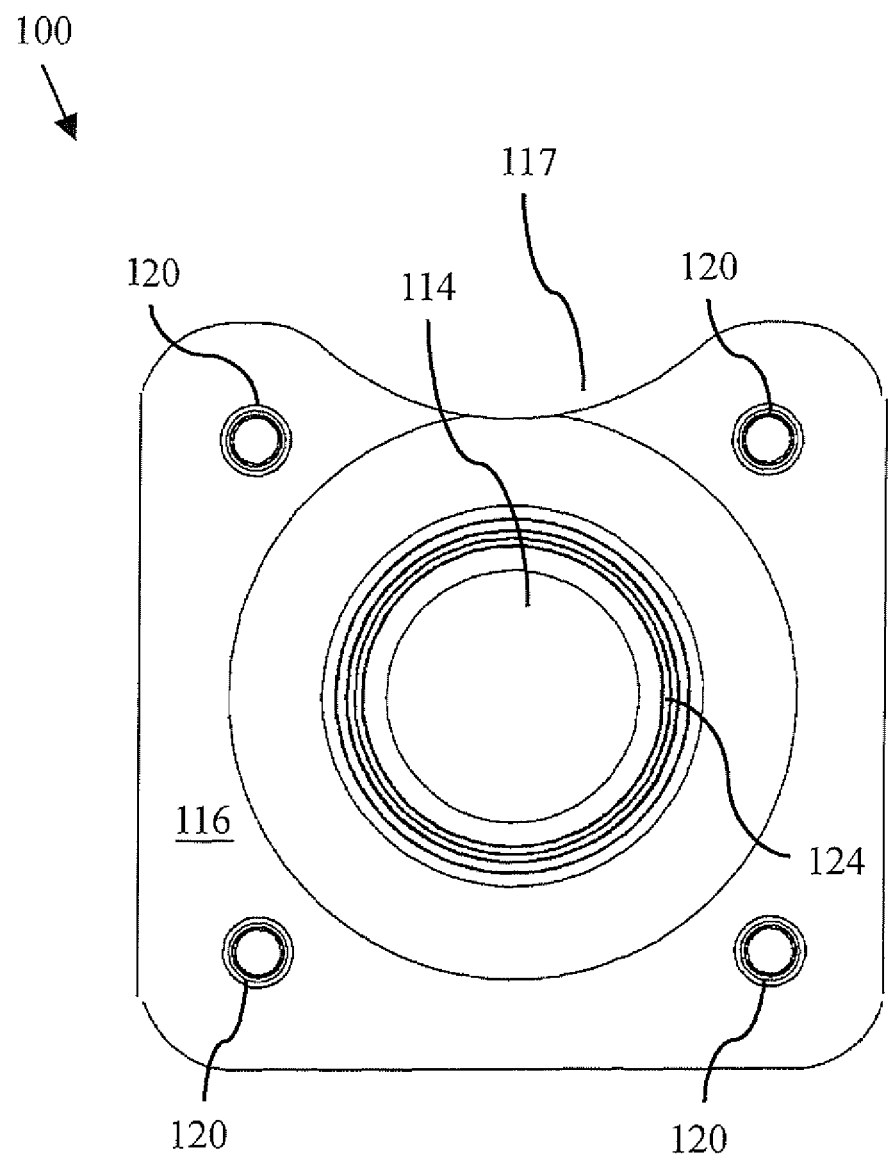
FIG. 11 depicts a top view of an embodiment of the apparatus of FIG. 1.

FIG. 11 depicts a top view of an embodiment of the apparatus 100 of FIG. 1.

Figure 12:
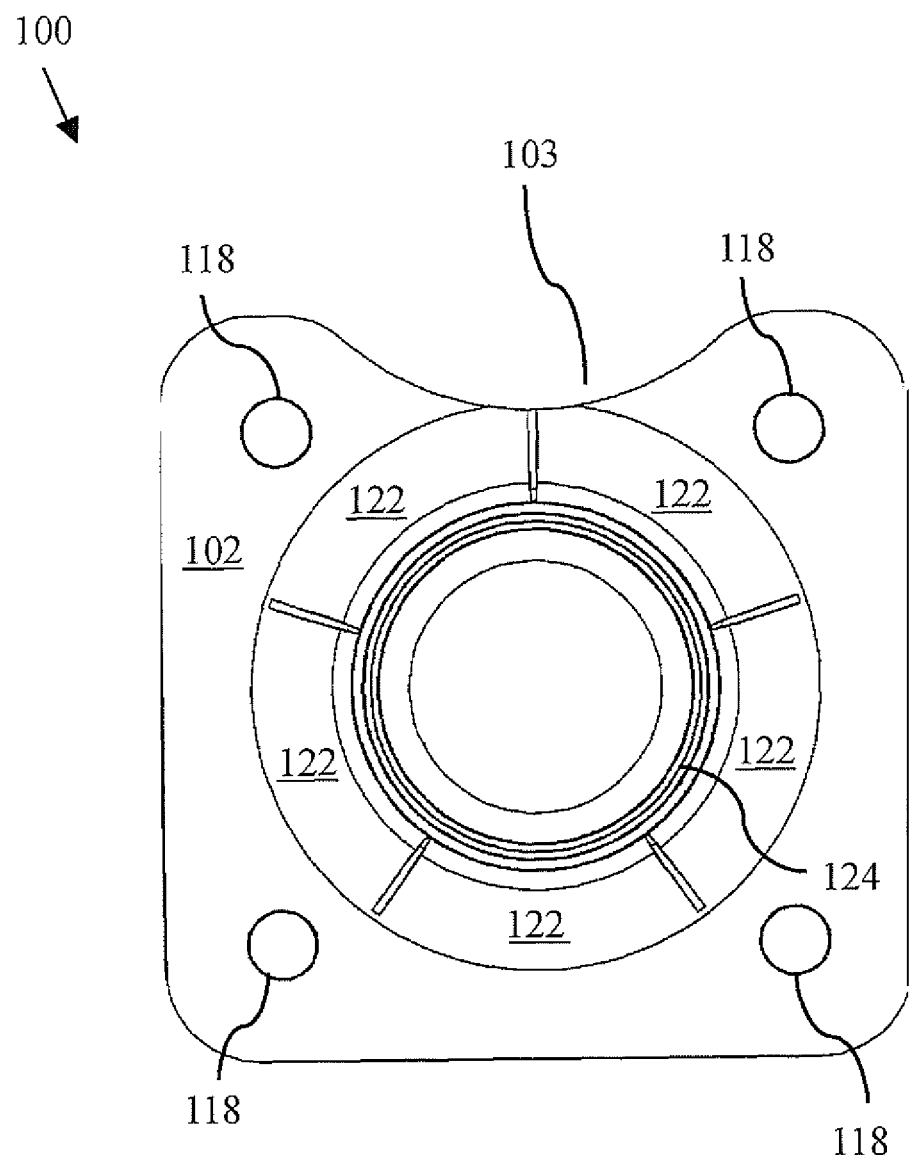
FIG. 12 depicts a top view of an embodiment of the apparatus of FIG. 1.

FIG. 12 depicts a top view of an embodiment of the apparatus 100 of FIG. 1.

Referring to the embodiment as depicted in FIG. 11, the support assembly 116 defines a notched support section 117. Further explanation for the purpose of the notched support section 117 is provided by the description associated with FIGS. 16 and 17.

Referring to the embodiment as depicted in FIG. 12, the flexible absorbent panel 102 defines a notched panel section 103. The notched panel section 103 is configured to correspond to the notched support section 117 of the support assembly 116 as depicted in FIG. 11. Further explanation for the purpose of the notched panel section 103 is provided by the description associated with FIGS. 16 and 17.

FIG. 13 depicts a side view of an embodiment of the apparatus 100 of FIG. 1.

Referring to the embodiment as depicted in FIG. 13, the flexible absorbent panel 102 is positioned over the support assembly 116. The accordion section 124 is depicted in a collapsed state, in which the bottom wall 109 is positioned close to the support assembly 116 (for convenient storage). The accordion section 124 is configured to selectively position the bottom wall 109 at a selectable position (relative to the support assembly 116).

FIG. 14 depicts a side view of an embodiment of the apparatus 100 of FIG. 1.

Referring to the embodiment as depicted in FIG. 14, the flexible absorbent panel 102 is attached to the support assembly 116. This is done in such a way that the flexible absorbent panel 102, in use, covers (at least in part) the top surface of the support assembly 116. The receiver assembly 106 is received (at least in part) in the cup receiver 900 of the drink-holder assembly 902. The accordion section 124 is expanded (elongated) into the interior of the cup receiver 900. The spaced-apart tapered sections 126 are configured to facilitate improved fitting of the apparatus 100 to various sizes of the drink-holder assembly 902 (as depicted in FIG. 14).

The accordion section 124 is expanded so that the bottom wall 109 of the upper wall portion 110 reaches toward (is placed closer to) the bottom wall of the drink-holder assembly 902.

FIG. 15 depicts a side view of an embodiment of the apparatus 100 of FIG. 1.

Referring to the embodiment as depicted in FIG. 15, the drink container 906 is received (at least in part) in the receiver assembly 106.

Figure 16:
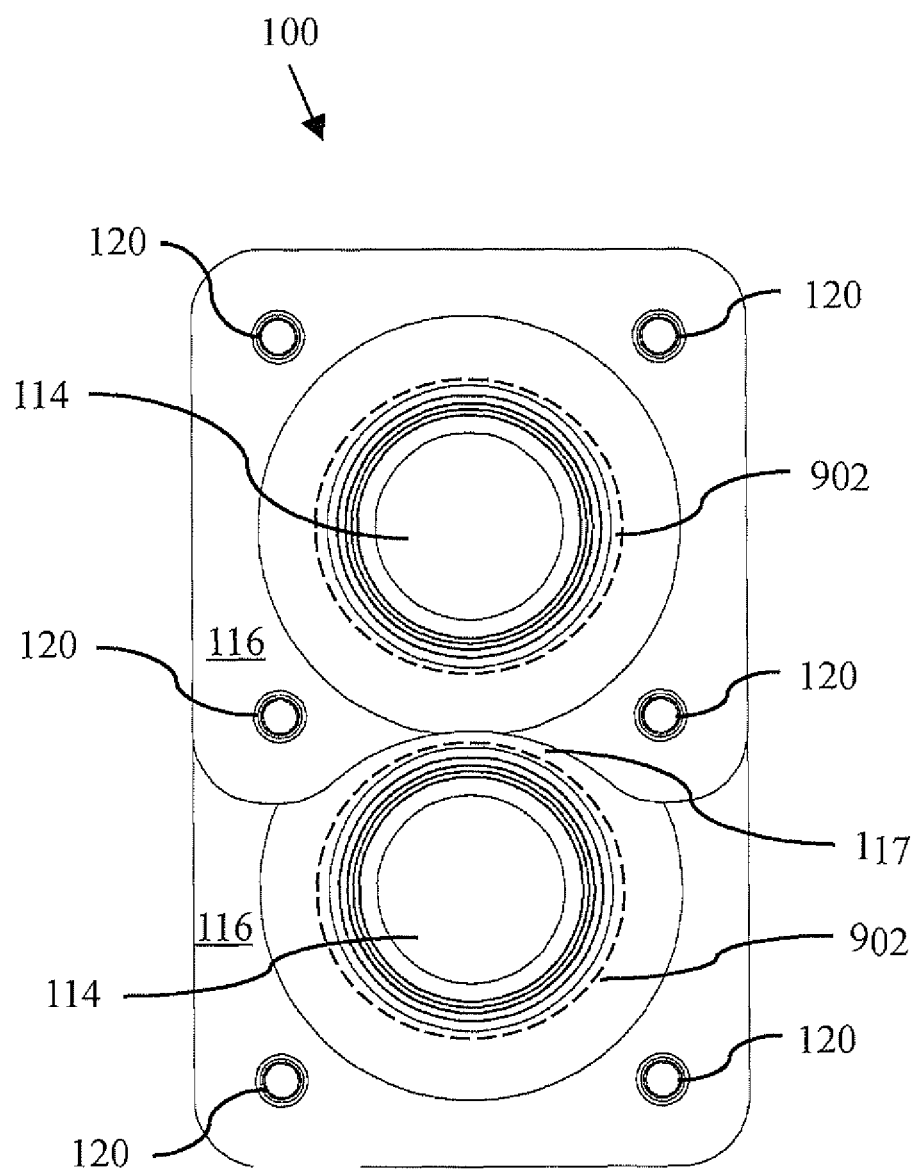
FIG. 16 depicts a top view of an embodiment of the apparatus of FIG. 1.

FIG. 16 depicts a top view of an embodiment of the apparatus 100 of FIG. 1.

Referring to the embodiment as depicted in FIG. 16, the flexible absorbent panel 102 and the support assembly 116 are positioned in such a way that a notched panel section 113 of the flexible absorbent panel 102 and a notched support section 117 of the support assembly 116 are lined up with each other. This is done in such a way that the apparatus 100 may be positioned immediately adjacent to another instance of the apparatus 100.

Figure 17:
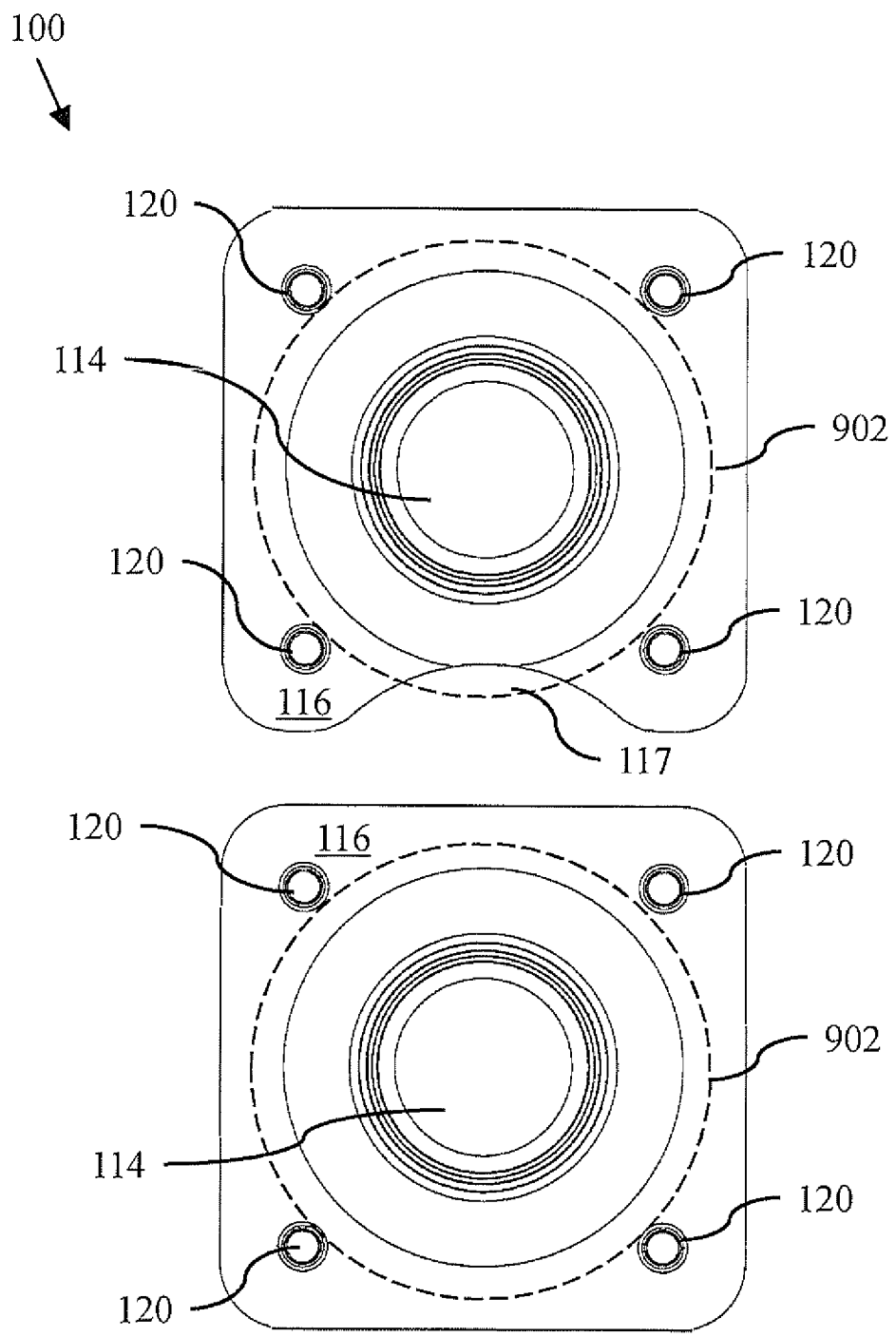
FIG. 17 depicts a top view of an embodiment of the apparatus of FIG. 1.

The case is depicted in which instances of the drink-holder assembly 902 are spaced apart from each other (one another) by a relatively smaller distance (compared to the embodiment as depicted in FIG. 17). For this case, the instances of the apparatus 100 are spaced apart (separated) from each other (one another) so that the instances of the apparatus 100, in use, touch or contact each other (one another or one against the other). Preferably, the outer peripheral edge of the support assembly 116 forms a square shape.

FIG. 17 depicts a top view of an embodiment of the apparatus 100 of FIG. 1.

Referring to the embodiment as depicted in FIG. 17, the case is depicted in which the instances of the drink-holder assembly 902 are spaced apart from each other by a relatively larger distance (compared to the embodiment as depicted in FIG. 16). For this case, the instances of the apparatus 100 are spaced apart (separated) from each other so that the instances of the apparatus 100 do not touch or contact each other. Preferably, the outer peripheral edge of the support assembly 116 forms a square shape.

Figure 18:
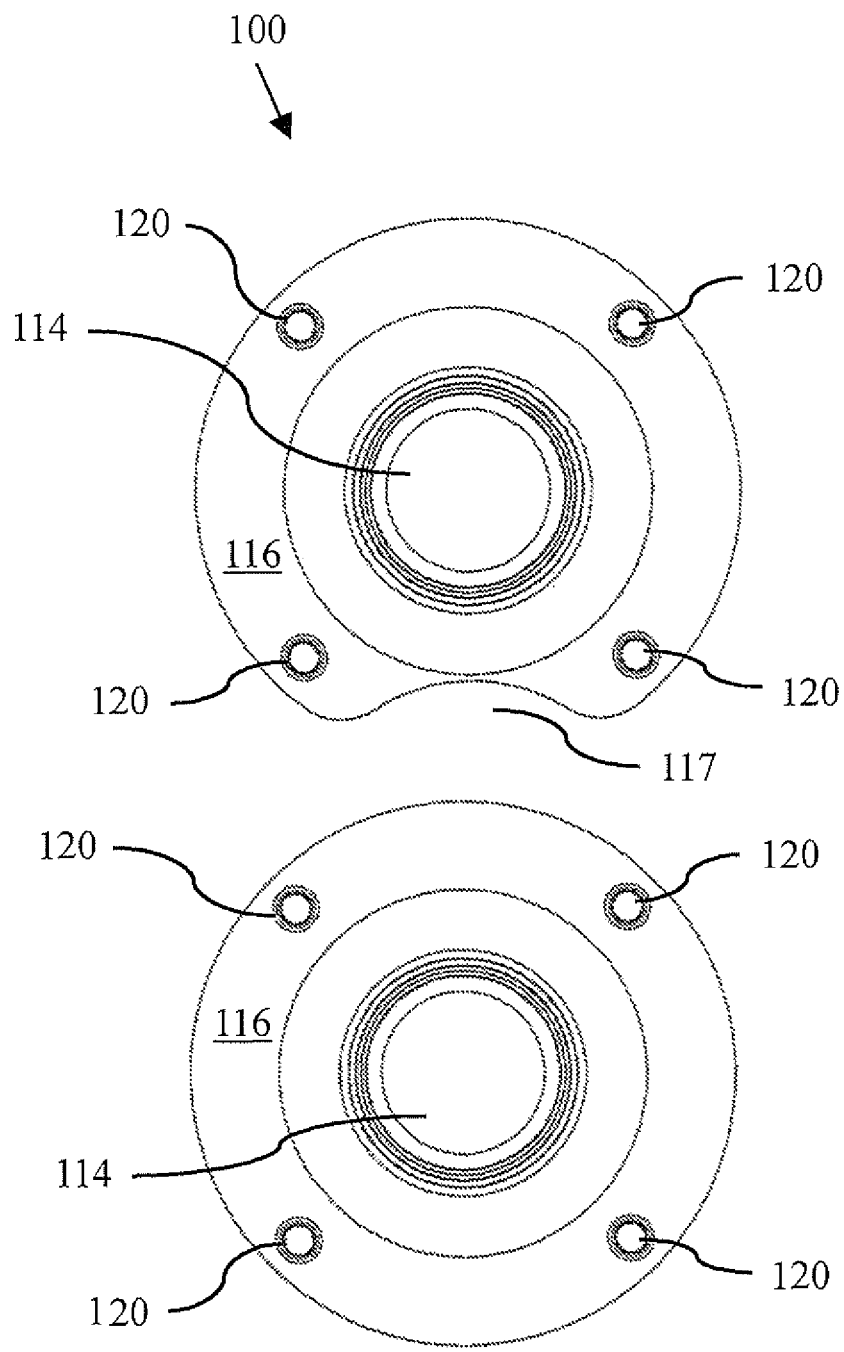
FIG. 18 depicts a top view of an embodiment of the apparatus of FIG. 1.

FIG. 18 depicts a top view of an embodiment of the apparatus 100 of FIG. 1.

Referring to the embodiment as depicted in FIG. 18, the outer peripheral edge of the support assembly 116 forms a circular shape.

Referring to the embodiments as depicted in FIGS. 16, 17 and 18, a first instance of the support assembly 116 includes the notched support section 117. A second instance of the support assembly 116 does not include the notched support section 117. The first instance of the support assembly 116 and the second instance of the support assembly 116 may be positioned closer to each other as a result of the notched support section 117 (to better accommodate the specific geometry of the cup receiver 900 of the drink-holder assembly 902, as depicted in FIG. 1). As depicted in FIG. 1, a first instance of the cup receiver 900 is positioned adjacent to a second instance of the cup receiver 900 of the drink-holder assembly 902. The notched support section 117 assists in accommodating the specific geometry of (position of) the cup receivers 900.

Figure 19:
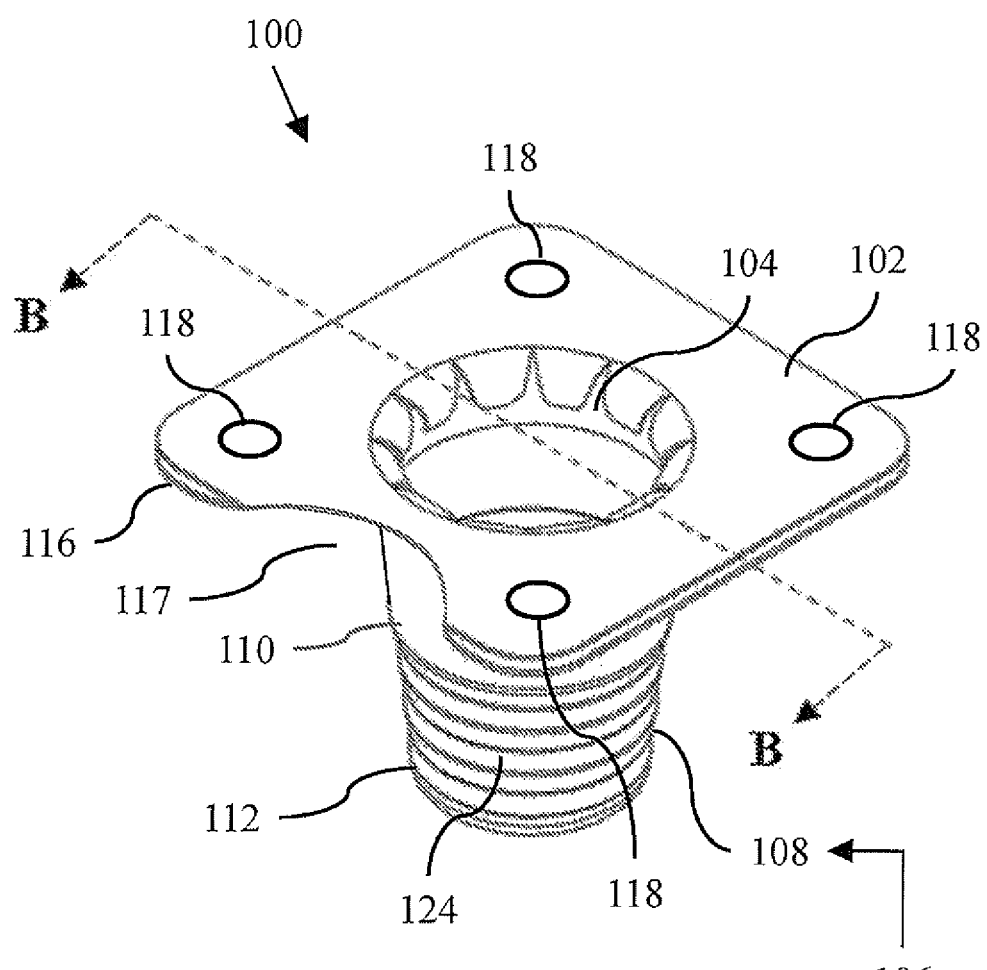
FIG. 19 depicts a top perspective view of an embodiment of the apparatus of FIG. 1.

FIG. 19 depicts a top perspective view of an embodiment of the apparatus 100 of FIG. 1.

Referring to the embodiment as depicted in FIG. 19, the flexible absorbent panel 102 and the support assembly 116 are positioned in such a way that the notched panel section 113 of the flexible absorbent panel 102 and the notched support section 117 of the support assembly 116 are lined up with each other. This is done in such a way that the apparatus 100 may be positioned immediately adjacent to another instance of the apparatus 100 (as depicted in FIG. 16).

Figure 20:
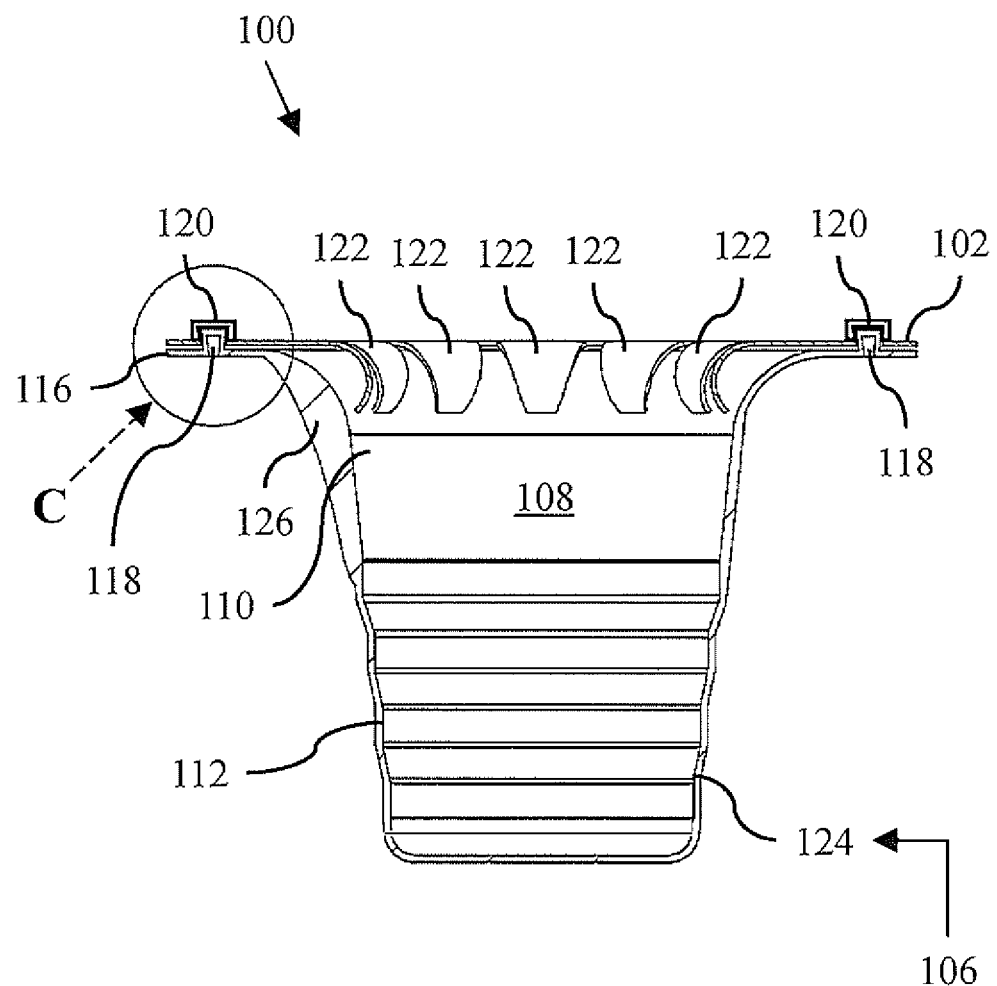
FIG. 20 depicts a cross-sectional view of an embodiment of the apparatus of FIG. 1.

FIG. 20 depicts a cross-sectional view of an embodiment of the apparatus 100 of FIG. 1. The cross-sectional view is taken along a cross-sectional line B-B depicted in FIG. 19.

Referring to the embodiment as depicted in FIG. 20, the accordion section 124 is depicted in an expanded condition or state. The panel connector 118 of the support assembly 116 is positioned at the outer periphery zone of the support assembly 116. The support connector 120 of the flexible absorbent panel 102 is positioned at the outer periphery zone of the flexible absorbent panel 102. Preferably, the support connector 120, in use, covers the panel connector 118 once the support connector 120 connects to the panel connector 118. The spaced-apart tapered sections 126 are configured to facilitate the improved fitting of the apparatus 100 to various sizes of the drink-holder assembly 902 (as depicted in FIG. 14).

Preferably, the wiper assembly 122 extends downwardly into the interior of the apparatus 100. The wiper assembly 122 is configured to wipe (remove) condensation from the drink container 906 (such as a cup) once the drink container 906 is moved relative to the wiper assembly 122. Alternatively, the condensation from the drink container 906, in use, drips downwardly along the side wall of the drink container 906 to contact the wiper assembly 122. Preferably, the wiper assembly 122 includes spaced apart tapered pieces extending from the flexible absorbent panel 102.

Figure 21:
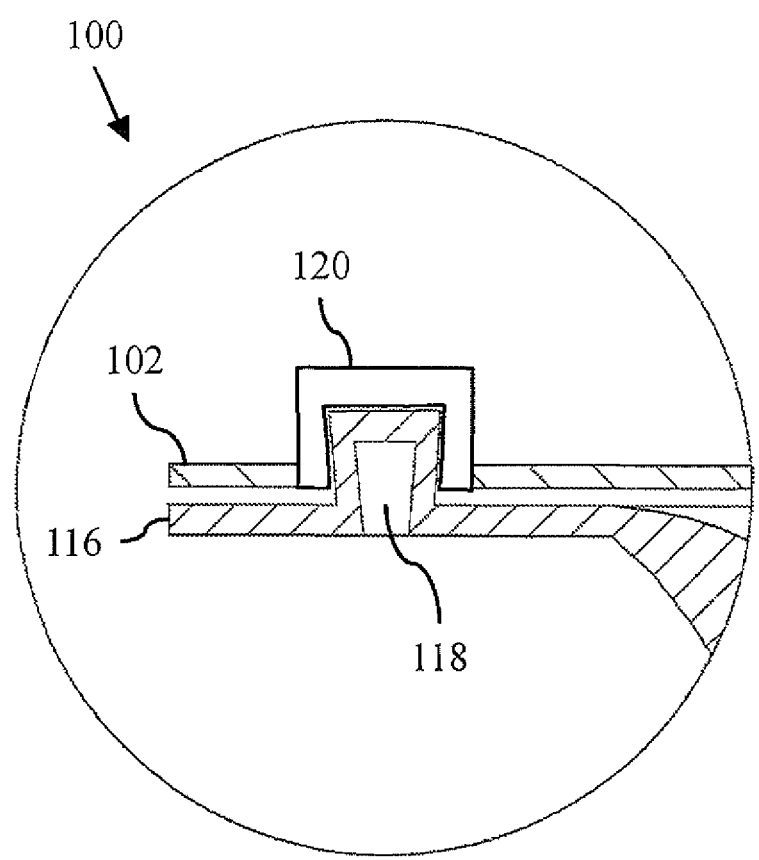
FIG. 21 depicts a close-up cross-sectional side view of an embodiment of the apparatus of FIG. 1.

FIG. 21 depicts a close-up cross-sectional side view of an embodiment of the apparatus 100 of FIG. 1. The close-up view of FIG. 21 is from a circle C depicted in FIG. 20.

Referring to the embodiment as depicted in FIG. 21, the panel connector 118 and the support connector 120 are configured to be selectively connectable and selectively disconnectable from each other (snap connectable and snap disconnectable). This is done in such a way that the flexible absorbent panel 102 and the support assembly 116, in use, and at least in part, contact each other, and the flexible absorbent panel 102, in use, rests relatively flat on the support assembly 116 (in a flat condition). Preferably, at least a portion of the panel connector 118 is configured to be securely received in an interior of the support connector 120.

FIGS. 22-33 illustrate another apparatus 1000. The apparatus 1000 is similar to the apparatus 100 as described above and illustrated in FIGS. 1-21, except as detailed below.

Figure 22:
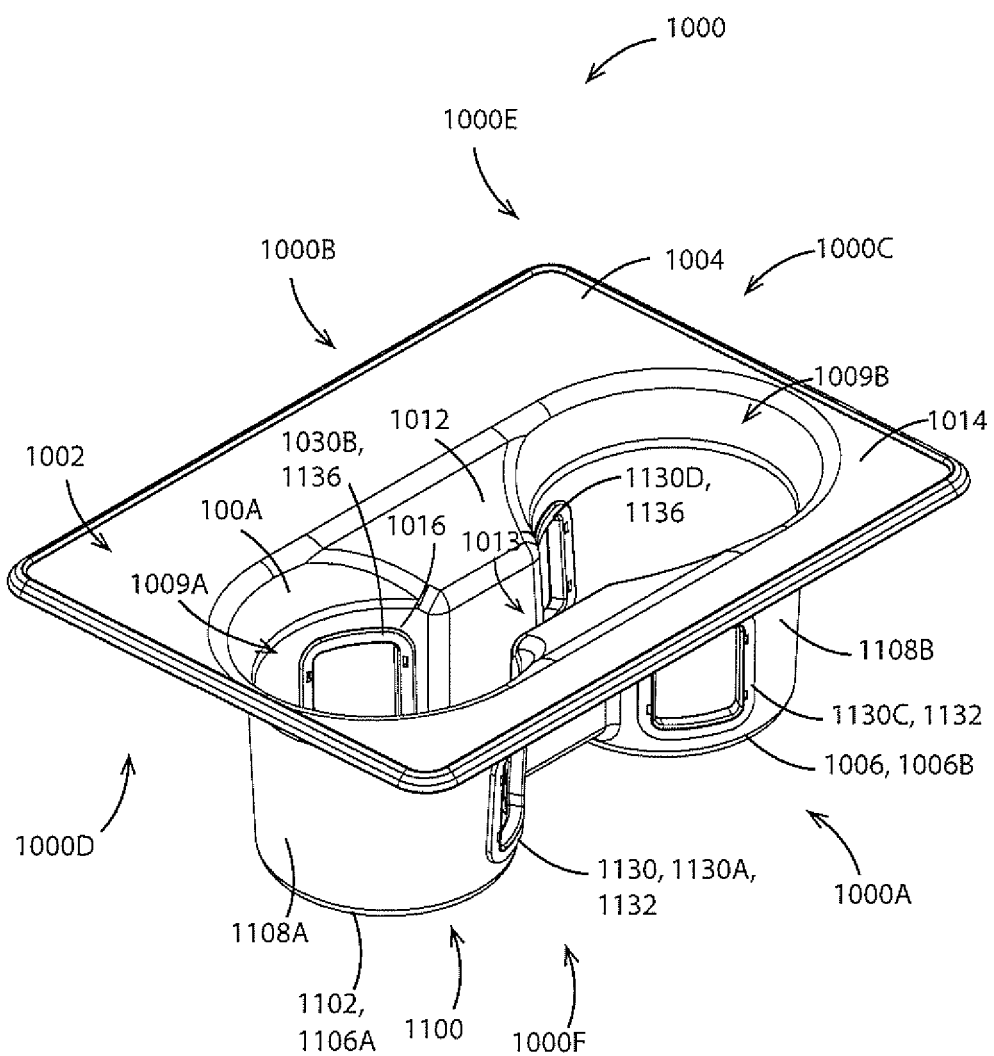
FIG. 22 depicts a front, top, right isometric perspective view of another embodiment of the apparatus.
Figure 23:
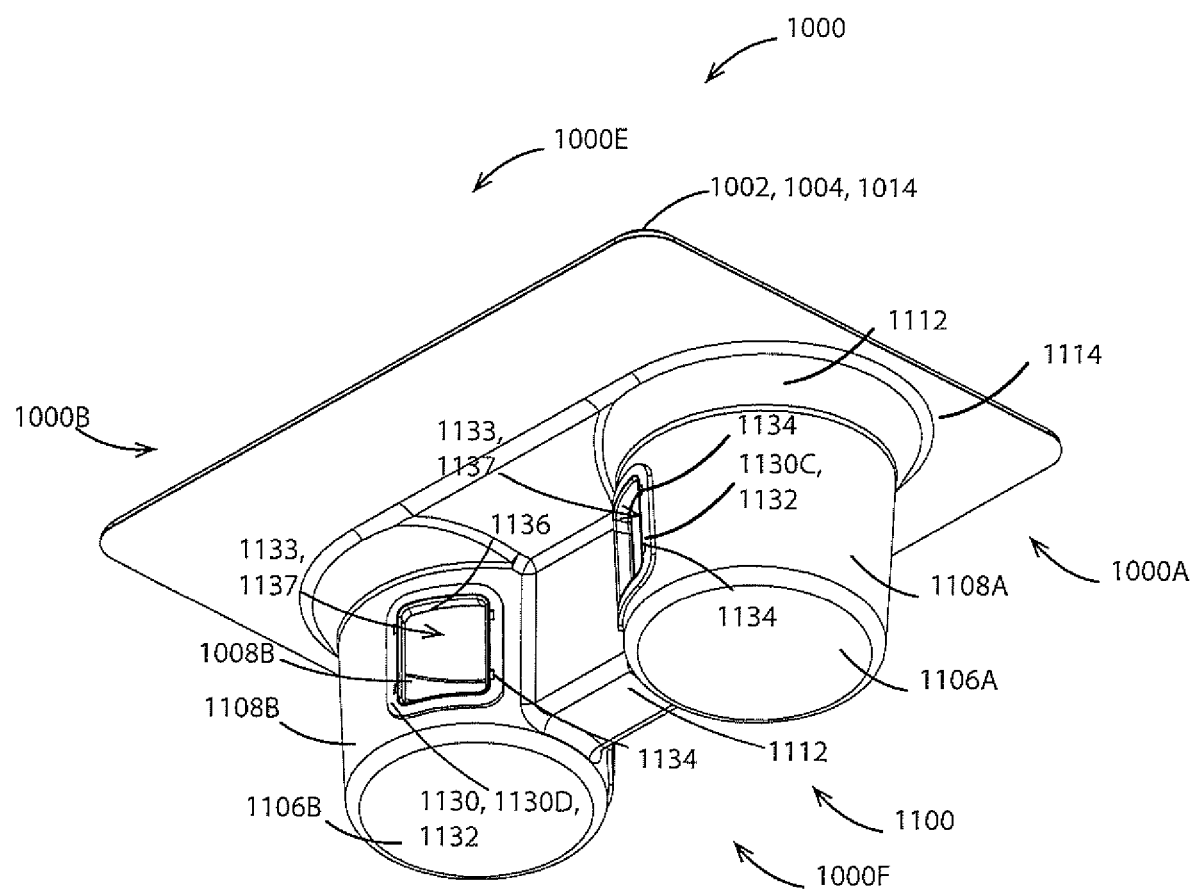
FIG. 23 depicts a rear, bottom, left isometric perspective view of the apparatus shown in FIG. 22.
Figure 24:
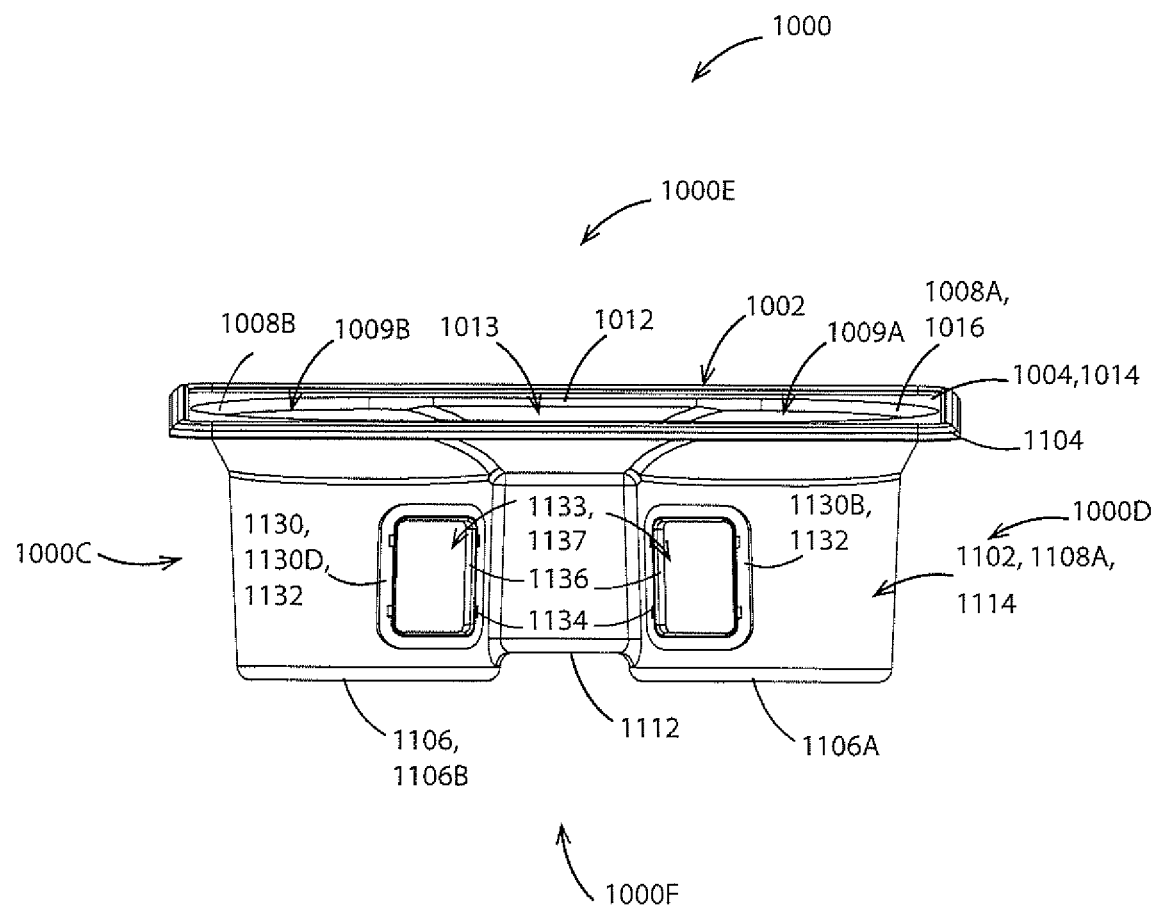
FIG. 24 depicts a front elevation view of the apparatus shown in FIG. 22.
Figure 25:
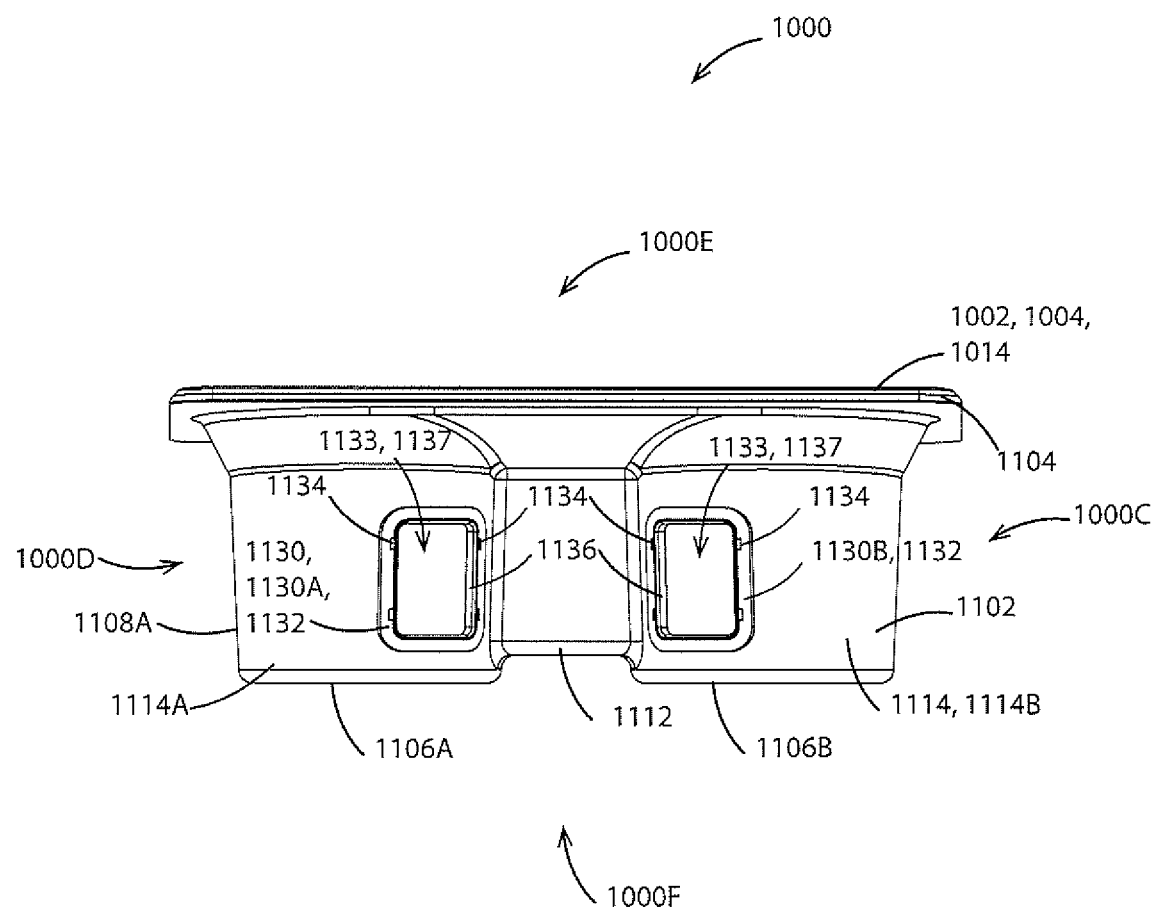
FIG. 25 depicts a rear elevation view of the apparatus shown in FIG. 22.
Figure 26:
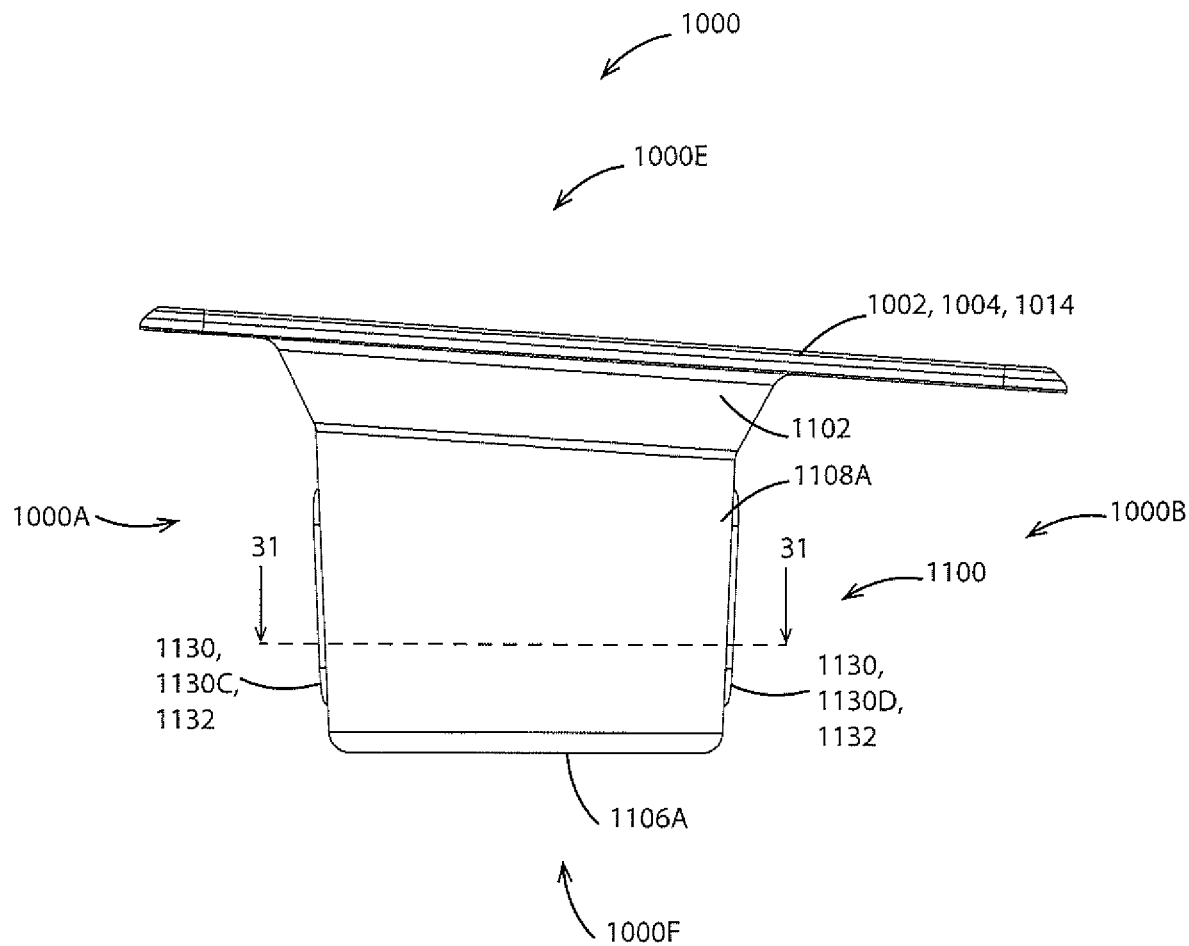
FIG. 26 depicts a left side elevation view of the apparatus shown in FIG. 22.
Figure 27:
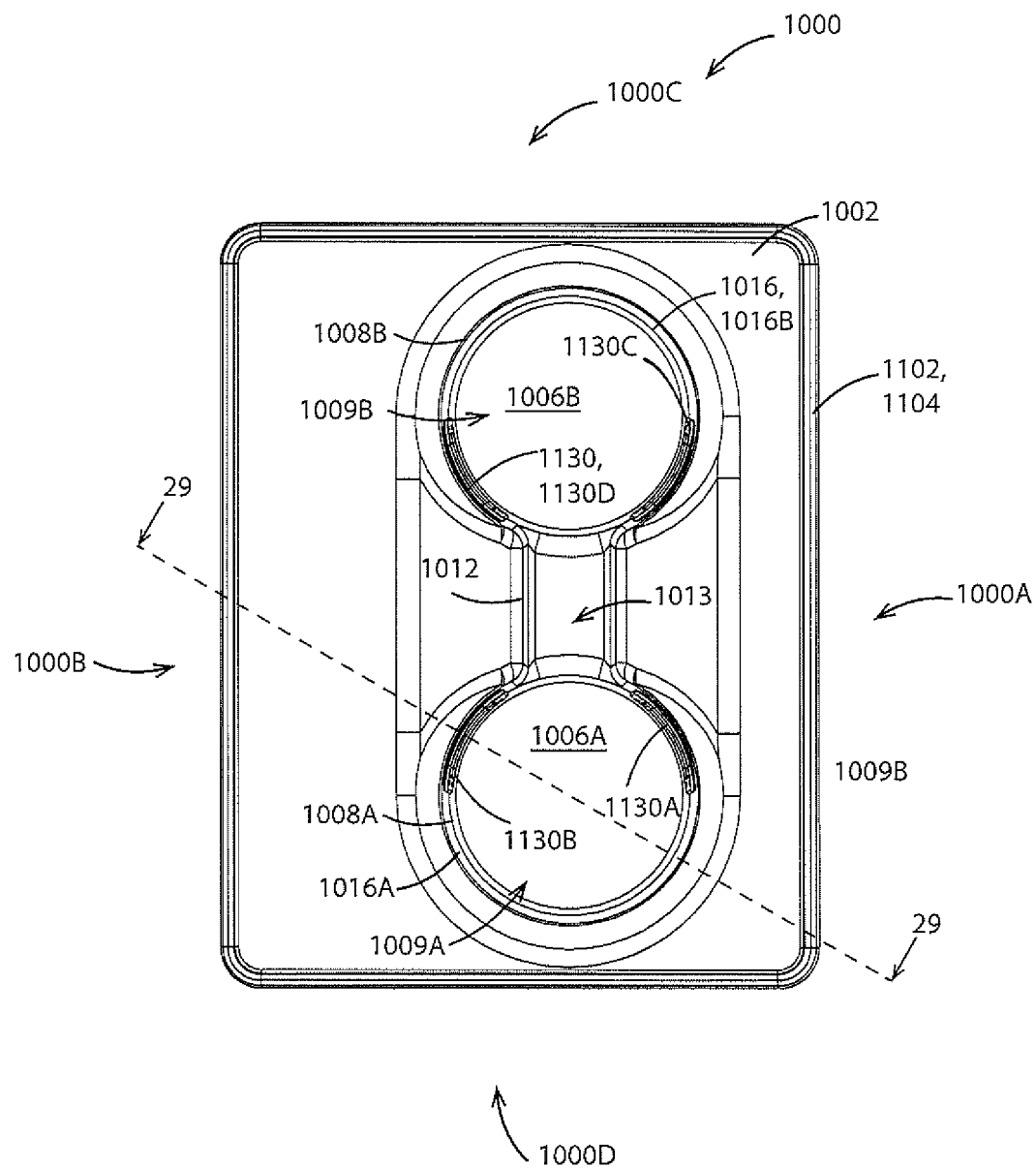
FIG. 27 depicts a top plan view of the apparatus shown in FIG. 22.
Figure 28:
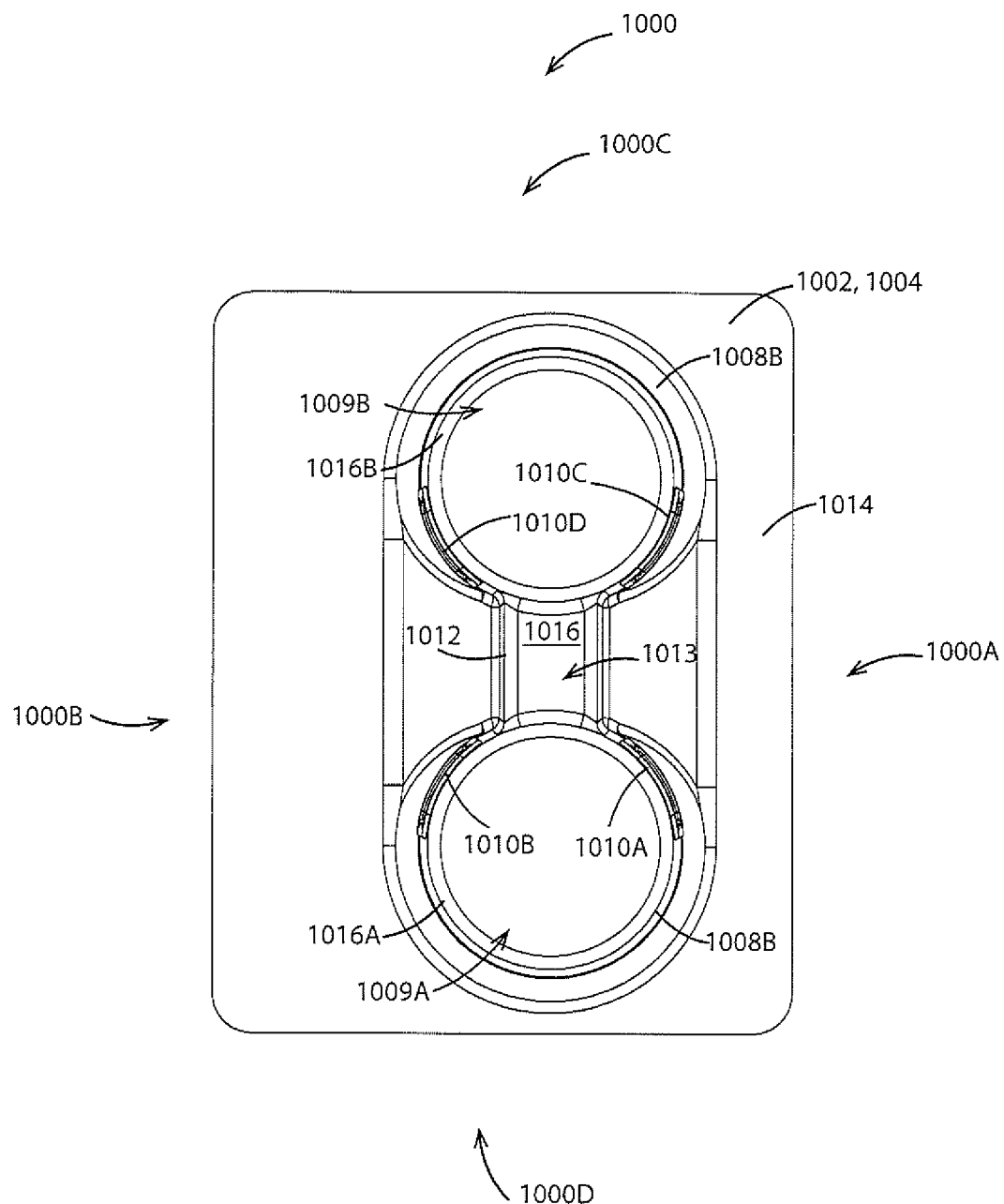
FIG. 28 depicts a top plan view of a panel of the apparatus shown in FIG. 22.

Referring to FIGS. 22 and 23, the apparatus 1000 may have a front end 1000A, an opposing rear end 1000B, and a transverse axis defined therebetween. The apparatus 1000 may also have a left side or first side 1000C, an opposing right side or second side 1000D, and a longitudinal axis defined therebetween. The apparatus 1000 may also have a top end 1000E, and opposing bottom end 1000F, and a vertical axis defined therebetween.

The apparatus 1000 may include a flexible absorbent panel (hereinafter "panel") generally referred to as 1002 and a receiver assembly generally referred to as 1100. The panel 1002 is substantially similar to the flexible absorbent panel 102 described above, except as detailed below. The receiver assembly 1100 is also substantially similar to the receiver assembly 106 described above, except as detailed below.

Figure 33:
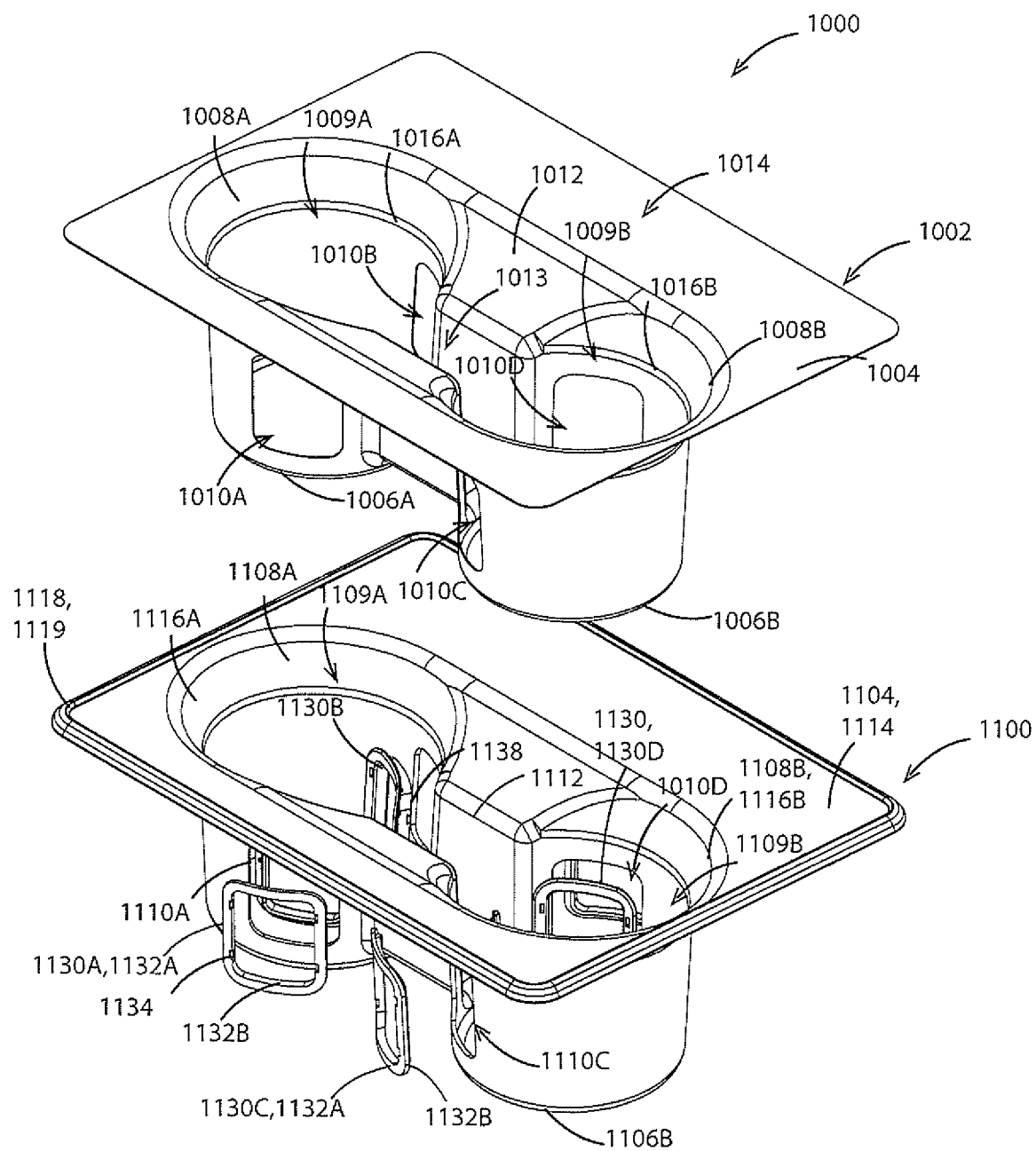
FIG. 33 depicts an exploded view of the apparatus shown in FIG. 22.

As illustrated in FIGS. 22 and 33, the panel 1002 may have a top wall 1004 that is positioned proximate to the top end 1000E of the apparatus 1000. The panel 1002 may also have an opposing bottom wall 1006 that is positioned away from the top end 1000E of the apparatus 1000 and proximate to the bottom end 1000F of the apparatus 1000. As described below, the bottom wall 1006 may split into a first portion 1006A and a second portion 1006B. The panel 1002 may have at least one circumferential liner 1008 that extends downwardly from the top wall 1004 to the bottom wall 1006 and defines a cavity 1009. In the illustrated embodiment, the panel 1002 may have a first circumferential liner 1008A that extends downwardly from the top wall 1004 to the first portion 1006A of the bottom wall 1006 and defines a first cavity 1009A. The panel 1002 may also have a second circumferential liner 1008B that extends downwardly from the top wall 1004 to the second portion 1006B of the bottom wall 1006 and defines a second cavity 1009B. As illustrated in FIGS. 22 and 23, the first circumferential liner 1008A and the second circumferential liner 1008B are adjacent and parallel to one another relative to the vertical axis of the apparatus 1000. Additionally, the first circumferential liner 1008A and the second circumferential liner 1008B collectively share the bottom wall 1006 but are separate from one another.

As described in more detail below, each of the first circumferential liner 1008A and the second circumferential liner 1008B may be configured to receive any suitable drinking container or vessel based on the configuration of each of the first circumferential liner 1008A and the second circumferential liner 1008B illustrated herein. As illustrated in FIGS. 22 and 33, the first and second circumferential liners 1008A, 1008B are substantially cylindrical. In other exemplary embodiments, first and second liners of an apparatus may have any suitable shape, size, and configuration based on various considerations. In addition, the first and second circumferential liners 1008A, 1008B are formed of the same shape, size, and configuration. In other exemplary embodiments, a first circumferential liner and a second circumferential liner may be formed of different shapes, sizes, or configurations based on various considerations.

Figure 30:
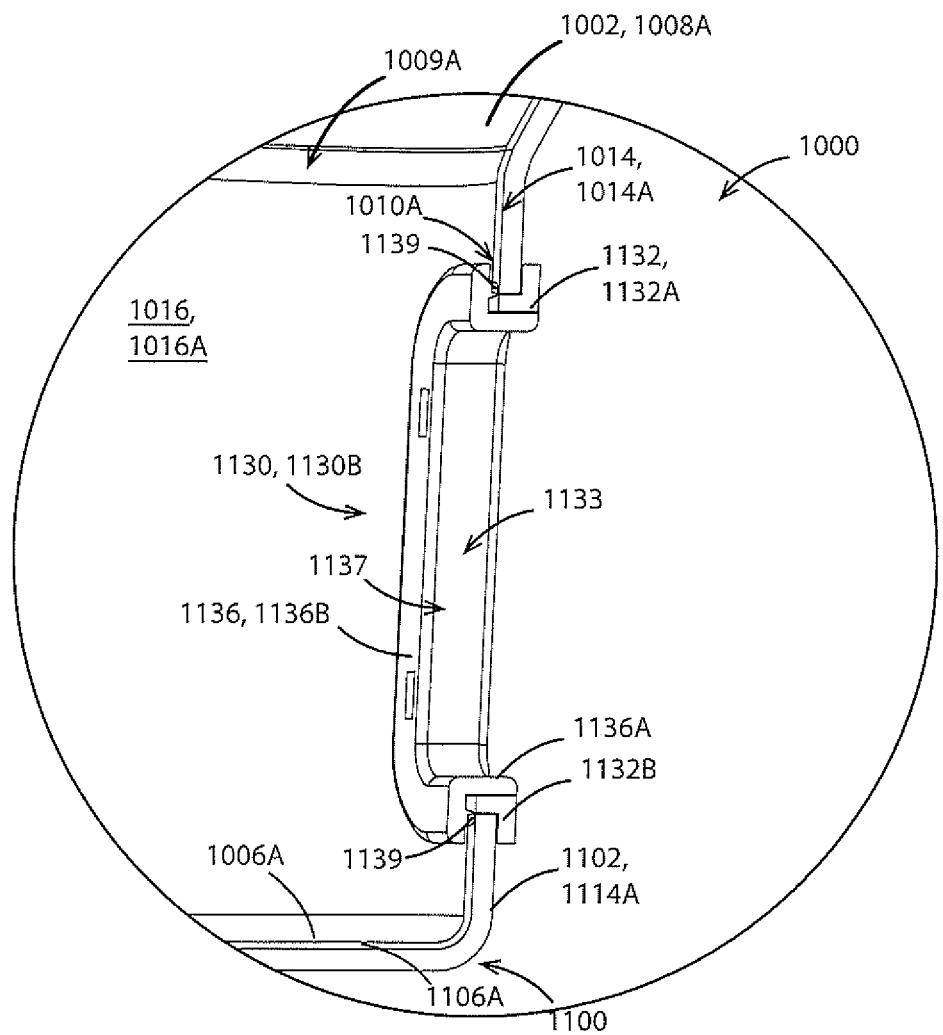
FIG. 30 depicts an enlarged view of the highlighted region shown in FIG. 29.
Figure 31:
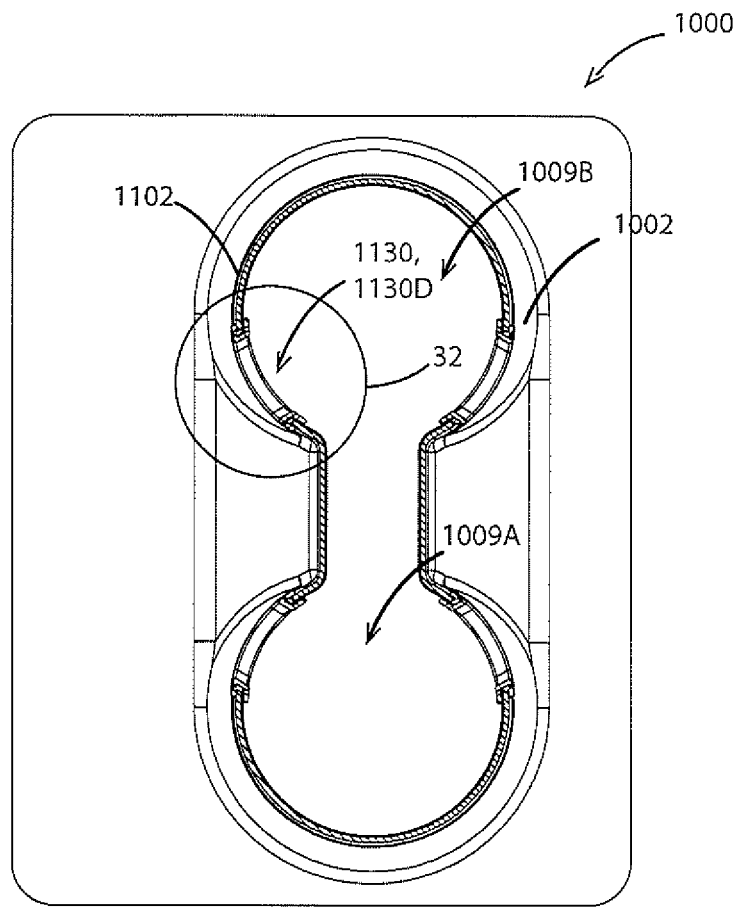
FIG. 31 depicts a sectional view of the apparatus taken in the direction of line 31-31 shown in FIG. 26
Figure 32:
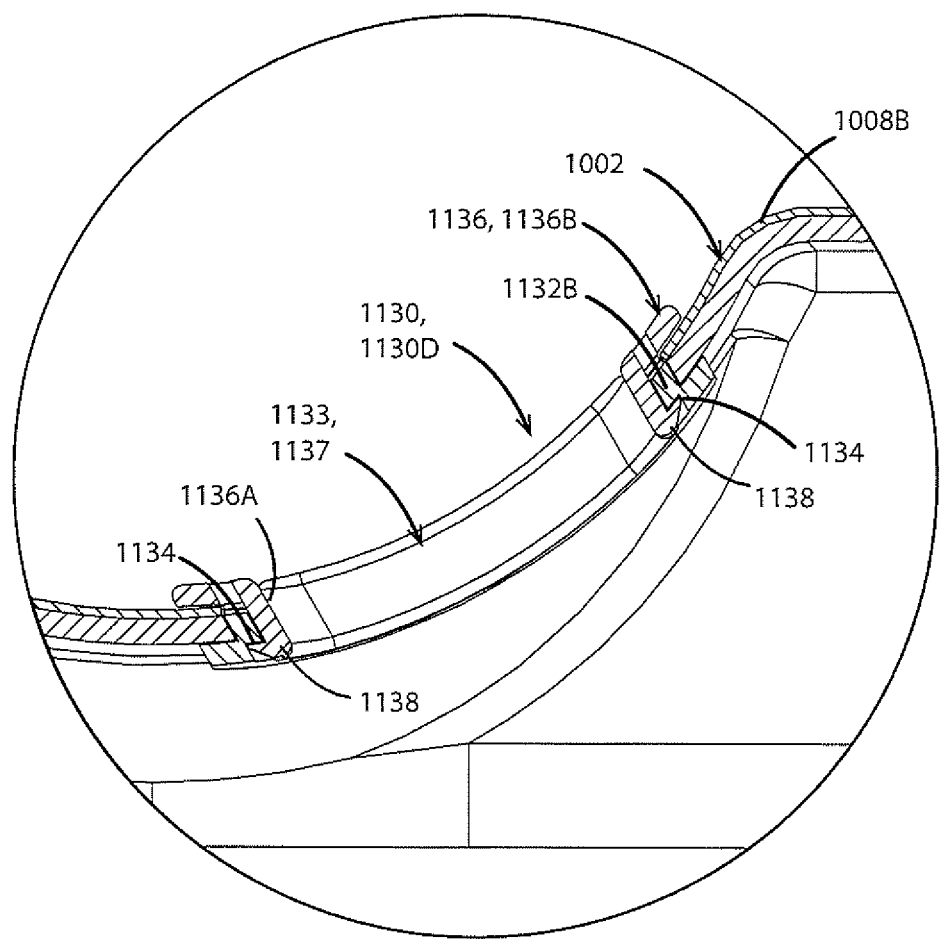
FIG. 32 depicts an enlarged view of the highlighted region shown in FIG. 31.

As illustrated in FIGS. 30, 32, and 33, the at least one circumferential liner 1008 may define at least one side aperture 1010. The at least one side aperture 1010 may extend entirely through the at least one circumferential liner 1008 where the cavity 1009 defined by the at least one circumferential liner 1008 is in fluid communication with the exterior environment between the top and bottom walls 1004, 1006 of the panel 1002. In the illustrated embodiment, the first circumferential liner 1008A may define a first side aperture 1010A that is proximate to the front end 1000A of the apparatus 1000 and an opposing second side aperture 10106 that is proximate to the rear end 1000B of the apparatus 1000. Additionally, the second circumferential liner 1008B may define a third side aperture 1010C that is proximate to the front end 1000A of the apparatus 1000 and an opposing fourth side aperture 1010D that is proximate to the rear end 1000B of the apparatus 1000. The use of each aperture 1010A, 10106, 1010C, 1010D defined by the first circumferential liner 1008A and the second circumferential liner 1008B is described in more detail below.

As illustrated in FIGS. 22, 27-28, 31, and 33, the panel 1002 may define a medial liner 1012 that extends between the first circumferential liner 1008A and the second circumferential liner 1008B. The medial liner 1012 may define a channel 1013 that extends from the first circumferential liner 1008A to the second circumferential liner 1008B. In the illustrated embodiment, the channel 1013 defined by the medial liner 1012 is in fluid communication with the first cavity 1009A and the second cavity 1009B where the first cavity 1009A and the second cavity 1009B are also in fluid communication with one another. The channel 1013 defined by the medial liner 1012 may allow a handle of a drinking container or vessel to be housed inside of the channel 1013 to adequately place and secure the drinking container or vessel inside either one of the first circumferential liner 1008A and the second circumferential liner 1008B.

Figure 29:
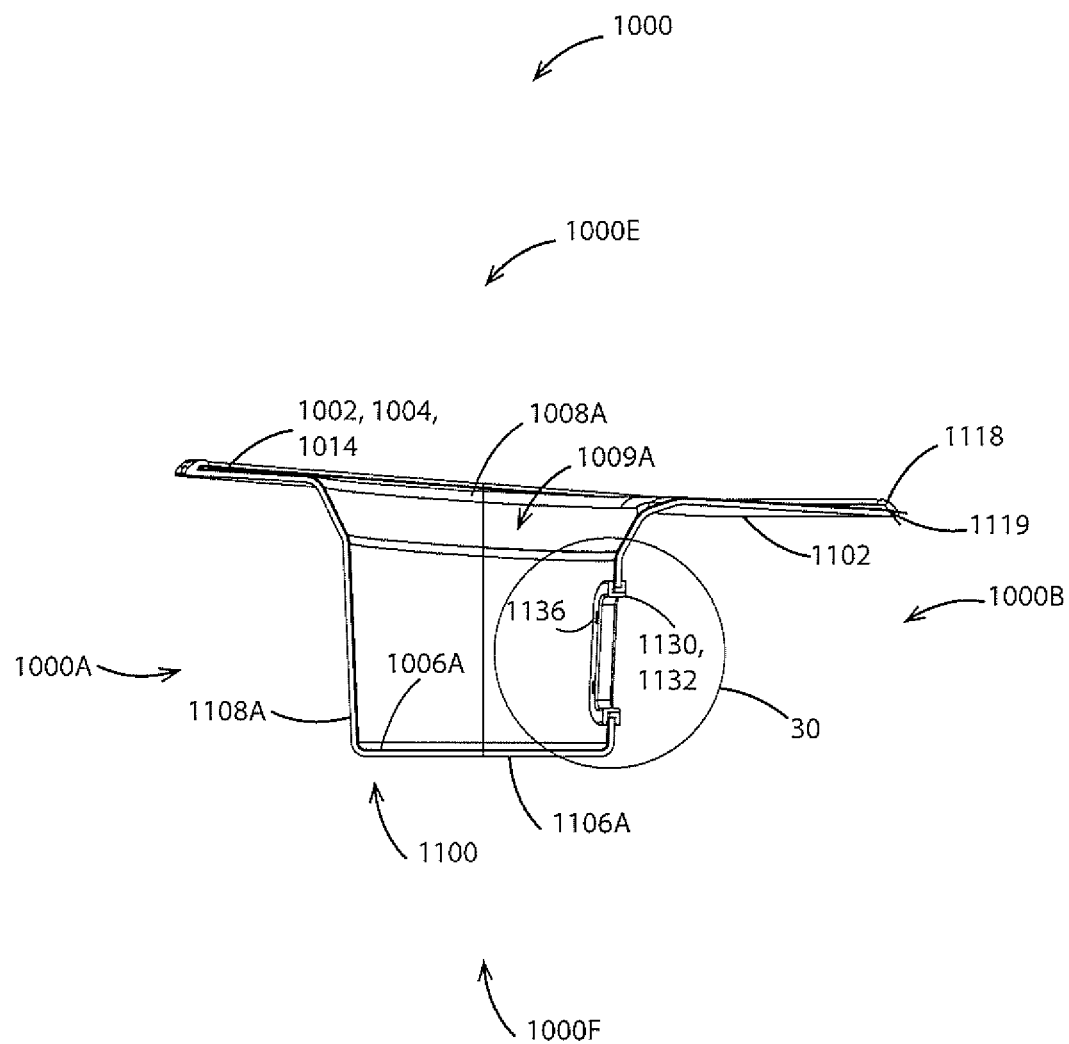
FIG. 29 depicts a sectional view of the apparatus taken in the direction of line 29-29 shown in FIG. 27.

As illustrated in FIGS. 29-30 and 33, the panel 1002 may define an outer surface 1014 and an opposing inner surface 1016. In the illustrated embodiment, the outer surface 1014 of the panel 1002 is continuous from the top wall 1004 of the panel 1002 to the bottom wall 1006 of the panel 1002 and exterior to the first cavity 1009A, the second cavity 1009B, and the channel 1013. The outer surface 1014 may be in fluid communication with fluid or material contained inside of the drinking container or vessel that is housed inside of one or both of the first circumferential liner 1008A and the second circumferential liner 1008B. The inner surface 1016 of the panel 1002 is continuous inside of the first circumferential liner 1008A, the second circumferential liner 1008B, and the medial liner 1012. This inner surface 1016 may also be in fluid communication with the exterior surface of a drinking container or vessel and in fluid communication with fluid or material contained inside of the drinking container or vessel.

The panel 1002 is considered advantageous at least because the panel 1002 protects the receiver assembly 1100 and other objects or surfaces in which the apparatus 1000 is provided on when fluid or material exits from the drinking container or vessel. As described in more detail below, the panel 1002 may be interlockingly secured with the receiver assembly 1100 in which the panel 1002 may be maintained with the receiver assembly 1100 and may be removed from the receiver assembly 1100. In other words, the panel 1002 is removably attachable from the receiver assembly.

As illustrated in FIGS. 22-33, the receiver assembly 1100 may include a base member 1102. The base member 1102 may have a top wall 1104 positioned proximate to the top end 1000E of the apparatus 1000 and positioned adjacent to the top wall 1004 of the panel 1002 when the base member 1102 and the panel 1002 operably engage one another. The base member 1102 may also have an opposing bottom wall 1106 positioned proximate to the bottom end 1000E of the apparatus 1000 and positioned adjacent to the bottom wall 1006 of the panel when the base member 1102 and the panel 1002 operably engaged one another. As described below, the bottom wall 1106 may split into a first portion 1106A and a second portion 1106B.

The base member 1102 may have at least one circumferential wall 1108 that extends downwardly from the top wall 1104 to the bottom wall 1106 and defines a cavity 1109. In the illustrated embodiment, the base member 1102 may have a first circumferential wall 1108A that extends downwardly from the top wall 1104 to the first portion 1106A of the bottom wall 1106 and defines a first recess 1109A. The base member 1102 may also have a second circumferential wall 1108B that extends downwardly from the top wall 1104 to the second portion 11066 of the bottom wall 1106 and defines a second recess 1109B. As illustrated in FIGS. 22 and 23, the first circumferential wall 1108A and the second circumferential wall 11086 are adjacent and parallel to one another relative to the vertical axis of the apparatus 1000. Additionally, the first circumferential wall 1108A and the second circumferential wall 1108B collectively share the bottom wall 1106 but are separate from one another.

Each of the first circumferential walls 1108A and the second circumferential wall 1108B may be configured to receive any suitable drinking container or vessel based on the configuration of each of the first circumferential wall 1108A and the second circumferential wall 11086 illustrated herein. As illustrated herein, the first and second circumferential walls 1108A, 1108B are substantially cylindrical. In other exemplary embodiments, first and second circumferential walls of a base member may have any suitable shape, size, and configuration based on various considerations. In addition, the first and second circumferential walls 1108A, 1108B are formed of the same shape, size, and configuration. In other exemplary embodiments, a first circumferential wall and a second circumferential wall of a base member may be formed of different shapes, sizes, or configurations based on various considerations.

As illustrated in FIGS. 22 and 29-30, the first and second circumferential walls 1108A, 1108B may be configured to allow the first and second circumferential liners 1008A, 10086 of the panel 1002 to be disposed inside of said first and second circumferential walls 1108A, 1108B. As such, the first and second circumferential liners 1008A, 10086 cover and/or protect the recesses 1109A, 11096 defined by the first and second circumferential walls 1108A, 1108B from liquid and other materials disposed inside of a drinking container or vessel held by the apparatus 1000. Additionally, the top wall 1004 of the panel 1002 covers and/or protects the top wall 1104 of the base member 1102 from liquid and other materials disposed inside of a drinking container or vessel held by the apparatus 1000.

As illustrated in FIGS. 30, 32, and 33, the at least one circumferential wall 1108 may define at least one side opening 1110. The at least one side opening 1110 may extend entirely through at least one circumferential wall 1108 where the recess 1109 defined by the at least one circumferential wall 1108 is in fluid communication with the exterior environment between the top wall 1104 and the bottom wall 1106 of the base member 1102. In the illustrated embodiment, the first circumferential wall 1108A may define a first side opening 1110A that is proximate to the front end 1000A of the apparatus 1000 and an opposing second side opening 11106 that is proximate to the rear end 10006 of the apparatus 1000. Additionally, the second circumferential wall 11086 may define a third side opening 1110C that is proximate to the front end 1000A of the apparatus 1000 and an opposing fourth side opening 1110D that is proximate to the rear end 10006 of the apparatus 1000. The use of each aperture 1110A, 11106, 1110C, 1110D defined by the first circumferential wall 1108A and the second circumferential wall 11086 is described in more detail below.

As illustrated in FIGS. 22, 27-28, 31, and 33, the base member 1102 may define a medial wall 1112 that extends between the first circumferential wall 1108A and the second circumferential wall 1108B. The medial wall 1112 may define a passageway 1113 that extends from the first circumferential wall 1108A to the second circumferential wall 1108B. In the illustrated embodiment, the passageway 1113 defined by the medial wall 1112 is in fluid communication with the first recess 1109A and the second recess 11096 where the first recess 1109A and the second recess 1109B are also in fluid communication with one another. The passageway 1113 defined by the medial wall 1112 may allow a handle of a drinking container or vessel to be housed inside of the passageway 1113 to adequately place and secure the drinking container or vessel inside either one of the first circumferential wall 1108A and the second circumferential wall 11086.

As illustrated in FIGS. 29-30 and 33, the base member 1102 may define an outer surface 1114 and an opposing inner surface 1116. In the illustrated embodiment, the outer surface 1114 of the base member 1102 is continuous from the top wall 1104 of the base member 1102 to the bottom wall 1106 of the base member 1102 and exterior to the first recess 1109A, the second recess 11096, and the passageway 1113. The inner surface 1116 of the base member 1102 is continuous inside of the first circumferential wall 1108A, the second circumferential wall 11086, and the medial wall 1112. In the illustrated embodiment, the outer surface 1114 may operably engage with a support member or a structure (e.g., a table, interior support member of a vehicle, etc.) to maintain the apparatus 1000 in an upright position while holding at least one drinking container or vessel. In the illustrated embodiment, the inner surface 1116 may operably engage with and may contact the outer surface 1014 of the panel 1002 when the panel 1002 and the base member 1102 operably engaged with one another.

As illustrated in FIGS. 22, 30-33, the receiver assembly 1100 may include at least one retaining assembly 1130 to retain the panel 1002 with the base member 1102. In the illustrated embodiment, the receiver assembly 1100 may include a first retaining assembly 1130A and a second retaining assembly 1130B to retain the first circumferential liner 1008A of the panel 1002 with the first circumferential wall 1108A of the base member 1102. In addition, the receiver assembly 1100 may include a third retaining assembly 1130C and a fourth retaining assembly 1130D to retain the second circumferential liner 1008B of the panel 1002 with the second circumferential wall 11086 of the base member 1102. Each retaining assembly 1130A, 1130B, 1130C, 1130D is substantially similar to one another and are engaged with the panel 1002 and the base member 1102 in the same orientation. Inasmuch as retaining assemblies 1130A, 1130B, 1130C, 1130D are substantially similar, the following description will relate to the second retaining assembly 1130B (see FIGS. 29 and 30) and the fourth retaining assembly 1130D (see FIGS. 31 and 32). It should be understood, however, that the description of the second retaining assembly 1130B and the fourth retaining assembly 1130D applies substantially equal to the first and third retaining assemblies 1130A, 1130C.

The retaining assembly 1130 includes an outer frame 1132 operably engaged with an inner frame 1136. As illustrated in FIGS. 30, 32-33, the outer frame 1132 may include a front wall 1132A and an opposing rear wall 1132B extending laterally away from the front wall 1132A. The front wall 1132A and the rear wall 11326 may collectively define a central opening 1133 therethrough. The outer frame 1132 may also define at least one notch 1134 that extends into the front wall 1132A and away from the central opening 1133, which is described in more detail below. In the illustrated embodiment, the outer frame 1132 defines four notches 1134 in the front wall 1132A.

As illustrated in FIGS. 30, 32-33, the inner frame 1136 may also include a front wall 1136A and an opposing rear wall 11366 extending laterally away from the front wall 1132A. The front wall 1136A and the rear wall 11366 may collectively define a central opening 1137 therethrough. The inner frame 1136 may also define at least one hook 1138 that laterally extends away the rear wall 11366 and away from the central opening 1137. The at least one hook 1138 may operably engage with the outer frame 1132 inside of the at least one notch 1134. In the illustrated embodiment, the inner frame 1136 defines four hooks 1138 on the rear wall 11366 where each hook 1138 may operably engage with the outer frame 1132 inside of each notch 1134.

Additionally, the inner frame 1136 may have a protrusion 1139. The protrusion 1139 extends laterally away from the rear wall 11366 towards the front wall 1136A. The protrusion 1139 may also extend completely around the rear wall 11366 of the inner frame 1136. As illustrated in FIG. 30, the protrusion 1139 may also be positioned above the front wall 1136A of the inner frame 1136 where the protrusions 1139 and the front wall 1136A collectively define a slot 1140. As illustrated in FIG. 30, a portion of the rear wall 11326 of the outer frame 1132 is disposed inside of the slot 1140 and is operably engaged with the protrusion 1139 and the front wall 1136A of the inner frame 1136. This configuration may provide a structural mechanism in which the outer frame 1132 operably engages with the inner frame 1136 during assembly of the apparatus 1000.

Having described the structure of the apparatus 1000 and the various components and connections thereof within apparatus 100, methods of use thereof will now be described.

During use, a user of the apparatus 1000 may assemble the apparatus 1000 by introducing the panel 1002 to the base member 1102. Here, the first and second circumferential liners 1008A, 1008B may be introduced into the first and second recesses 1109A, 11096 of the first and second circumferential walls 1108A, 11086 by inserting the panel 1002 downwardly into the base member 1102. The user may keep inserting the panel 1002 into the base member 1102 until the first, second, third, and fourth side apertures 1010A, 10106, 1010C, 1010D of the panel 1002 are aligned with the first, second, third, and fourth side openings 1110A, 11106, 1110C, 1110D of the base member 1102. The user may also cease insertion of the panel 1002 into the base member 1102 when the top wall 1004 of the panel 1002 operably engages with the top wall 1104 of the base member 1100 where the top wall 1104 of the base member 1102 prevents any further downward movement of the panel 1002.

Once the panel 1002 is operably engaged with the base member 1102, each retaining assembly 1130 may be introduced to the panel 1002 and the base member 1102 to operably engage the panel 1002 and the base member 1102 together. During assembly, the user may introduce the outer frame 1132 and the inner frame 1136 of one of the first, second, third, and fourth retaining assemblies 1130A, 1130B, 1130C, 1130D to one of the first, second, third, and fourth side apertures 1010A, 10106, 1010C, 1010D of the panel 1002 and to one of the first, second, third, and fourth side openings 1110A, 11106, 1110C, 1110D of the base member 1102 to operably engage the panel 1002 and the base member 1102 together.

As illustrated in FIGS. 30 and 32, the user may introduce the outer frame 1132 and the inner frame 1136 of the first retaining assembly 1130A to the first side aperture 1010A of the panel 1002 and to the first side opening 1110A of the base member 1102. The user may first position and align the outer frame 1132 of the first retaining assembly 1130A with the first side opening 1110A exterior to the first recess 1109A of the first circumferential wall 1108A. Once aligned, the user may then insert the outer frame 1132 of the first retaining assembly 1130A into the base member 1102 (via the first side opening 1110A) and then into the panel 1002 (via the first side aperture 1010A). Once inserted, the front wall 1132A of the outer frame 1132 is operably engaged with the outer surface 1114 of the base member 1102 on the first circumferential wall 1108A. Once inserted, the rear wall 1132B of the outer frame 1132 is operably engaged with first circumferential wall 1108A inside of the first side opening 1110A.

Once the outer frame 1132 is inserted into the base member 1102, the user may then position and align the inner frame 1136 of the first retaining assembly 1130A with the first side aperture 1010A interior to the first cavity 1009A of the first circumferential liner 1008A and with the first side opening 1110A interior to the first recess 1109A of the first circumferential wall 1108A. Once aligned, the user may then insert the inner frame 1136 of the first retaining assembly 1130A into the panel 1002 (via the first side aperture 1010A) and then into the base member 1102 (via the first side opening 1110A). Once inserted, the front wall 1136A of the inner frame 1136 is operably engaged with the rear wall 11326 of the outer frame 1132. Additionally, the rear wall 11366 of the inner frame 1136 is operably engaged with the inner surface 1016 of the panel 1102 on the first circumferential liner 1008A. Moreover, each hook 1138 of the inner frame 1136 is operably engaged with the outer frame 1132 inside of a respective notch 1134 defined in the outer frame 1132. This method of operably engaging the outer frame 1132 with the inner frame 1136 may be repeated for the remaining retaining assemblies 1130B, 1130C, 1130D.

Once each retaining assembly 1130 is fully assembled, each retaining assembly 1130 provides an interlocking mechanism and/or a snap-fit mechanism to retain the panel 1002 with the base member 1102. The retaining assemblies 1130A, 1130B, 1130C, 1130D may also provide additional support and grip between the apparatus 1000 and a drinking container or vessel. If, however, the user needs to replace or remove the current panel 1002, the user may simply remove each retaining assembly 1130A, 1130B, 1130C, 1130D from the panel 102 and the base member 1102 in the reverse method as explained above.

While each retaining assembly 1130A, 1130B, 1130C, 1130D provides an interlocking mechanism and/or a snap-fit mechanism to retain the panel 1002 with the base member 1102, any suitable mechanism may be used for a retaining assembly to retain a panel with a base member. Examples of suitable mechanisms for a retaining assembly to retain a panel with a base member includes an attachment mechanism, an affixing mechanism, a connecting mechanism, a coupling mechanism, a fastening mechanism, a linking mechanism, a mounting mechanism, a riveting mechanism, a securing mechanism, and any other suitable mechanisms for a retaining assembly to retain a panel with a base member.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc.

Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An apparatus, comprising:
a panel having a top wall, a bottom wall opposite to the top wall, and at least one circumferential liner that extends between the top wall and the bottom wall and defining a cavity therein; and
a receiver assembly operably engaged with the panel and being adapted to be received by a drink-holder assembly of a vehicle, the receiver assembly comprises:
an upper wall of a base member that is covered by the top wall of the panel;
a lower wall of the base member opposing the upper wall and being covered by the bottom wall of the panel; and
at least one circumferential wall extending between the upper wall and the lower wall of the base member and defining a recess, wherein the at least one circumferential liner is housed inside of the recess;
at least one retaining assembly operably engaging with the at least one circumferential wall and at least one circumferential liner to maintain the base member and the panel together; wherein the at least one retaining assembly is free from engaging with the top wall of the panel and the upper wall of the base member;
wherein the receiver assembly is configured to retain the panel inside of the receiver assembly.

2. The apparatus of claim 1, wherein the receiver assembly is configured to interlockingly engage the panel with the receiver assembly.

3. The apparatus of claim 1, wherein the receiver assembly is configured to retain the panel inside of the receiver assembly via a snap-fit mechanism.

4. The apparatus of claim 1, wherein the receiver assembly further comprises:
at least one side opening defined in the at least one circumferential wall positioned between the upper wall of the base member and the lower wall of the base member.

5. The apparatus of claim 4, wherein the panel further comprises:

at least one side aperture defined in the at least one circumferential liner positioned between the top wall of the panel and the bottom wall of the panel.

6. The apparatus of claim 5, wherein the at least one side aperture of the panel and the at least one side opening of the base member are aligned with one another when assembled.

7. The apparatus of claim 5, wherein the at least one retaining assembly further comprises:
an outer frame; and
an inner frame operably engaged with the outer frame;
wherein the outer frame and the inner frame cooperatively maintain the base member and the panel together.

8. The apparatus of claim 7, wherein the outer frame interlockingly engages with the inner frame to cooperatively maintain the base member and the panel together.

9. The apparatus of claim 7, wherein the outer frame snap-fits with the inner frame to cooperatively maintain the base member and the panel together.

10. The apparatus of claim 7, wherein the outer frame further comprises:
a front wall operably engaged with an outer surface of the base member; and
a rear wall operably engaged with base member inside of the at least one side opening of the base member.

11. The apparatus of claim 10, wherein the inner frame further comprises:
a front wall operably engaged with the rear wall of the outer frame inside of the at least side aperture of the panel and inside of the at least one opening of the base member; and
a rear wall operably engaged with an inner surface of the panel and the rear wall of the outer frame.

12. The apparatus of claim 1, wherein the at least one circumferential wall of the receiver assembly receiver assembly further comprises:
a first circumferential wall extending from the upper wall of the base member to the lower wall of the base member and defining the recess;
a second circumferential wall extending from the upper wall of the base member to the lower wall of the base member and defining a second recess;
a first side opening defined in the first circumferential wall positioned between the upper wall of the base member and the lower wall of the base member; and
a second side opening defined in the second circumferential wall positioned between the upper wall of the base member and the lower wall of the base member.

13. The apparatus of claim 12, wherein the at least one circumferential liner of the panel further comprises:
a first circumferential liner extending from the top wall of the panel to the bottom wall of the panel and defining the cavity;
a second circumferential liner extending from the top wall of the panel to the bottom wall of the panel and defining a second cavity;
a first side aperture defined in the first circumferential liner positioned between the top wall of the panel and the bottom wall of the panel; and
a second side aperture defined in the second circumferential liner positioned between the top wall of the panel and the bottom wall of the panel.

14. The apparatus of claim 13, wherein first side opening of the base member is aligned with the first side aperture of the panel; and wherein second side opening of the base member is aligned with the second side aperture of the panel.

15. The apparatus of claim 13, wherein the at least one retaining assembly further comprises:
a first retaining mechanism operably engaged with the base member at the first side opening of said base member and with the panel at the first side aperture of said panel; and
a second retaining mechanism operably engaged with the base member at the second side opening of said base member and with the panel at the second side aperture of said panel.

16. The apparatus of claim 1, wherein the panel is formed from a flexible absorbent material.

17. The apparatus of claim 1, wherein the base member of the receiver assembly is formed of a rigid plastic material.

18. An apparatus, comprising:
a panel having a top wall, a bottom wall opposite to the top wall, and at least one circumferential liner that extends between the top wall and the bottom wall and defining a cavity therein;
a receiver assembly operably engaged with the panel and being adapted to be received by a drink-holder assembly of a vehicle, the receiver assembly comprises:
an upper wall of a base member that is covered by the top wall of the panel;
a lower wall of the base member opposing the upper wall and being covered by the bottom wall of the panel; and
at least one circumferential wall extending between the upper wall and the lower wall of the base member and defining a recess, wherein the at least one circumferential liner is housed inside of the recess; and
at least one retaining mechanism having an outer frame and an inner frame interlockingly engaged with one another at the at least one circumferential wall and at the least one circumferential liner to cooperatively maintain the base member and the panel together;
wherein the outer frame and the inner frame are each free from engaging with the top wall of the panel and the upper wall of the base member;
wherein the panel is removably attached with the receiver assembly.

19. An apparatus, comprising:
a panel defining a side aperture;
a base member of a receiver assembly operably engaged with the panel and defining a side opening aligned with the side aperture, the base member is adapted to be received by a drink-holder assembly of a vehicle;
an inner frame of a retaining mechanism engaging with the panel inside of a cavity defined by the panel between a top wall and a bottom wall; and
an outer frame of the retaining mechanism engaging with the inner frame and the base member between an upper wall and a lower wall of the base member;
wherein the outer frame and the inner frame interlockingly engaged with one another inside the side opening and inside the side aperture to cooperatively maintain the receiver assembly and the panel with one another; and
wherein the outer frame and the inner frame are each free from engaging with the top wall of the panel and the upper wall of the base member.

* * * * *